(12) United States Patent
Kishigami et al.

(10) Patent No.: US 10,397,444 B2
(45) Date of Patent: Aug. 27, 2019

(54) IMAGE DISPLAY APPARATUS AND DISPLAY CORRECTION METHOD

(71) Applicant: MITSUBISHI ELECTRIC CORPORATION, Tokyo (JP)

(72) Inventors: Tomo Kishigami, Tokyo (JP); Nobuo Takeshita, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 149 days.

(21) Appl. No.: 15/540,745

(22) PCT Filed: Jan. 7, 2016

(86) PCT No.: PCT/JP2016/050308
§ 371 (c)(1),
(2) Date: Jun. 29, 2017

(87) PCT Pub. No.: WO2016/117362
PCT Pub. Date: Jul. 28, 2016

(65) Prior Publication Data
US 2017/0353628 A1    Dec. 7, 2017

(30) Foreign Application Priority Data

Jan. 19, 2015    (JP) .................................. 2015-007417

(51) Int. Cl.
*H04N 1/60* (2006.01)
*G09G 3/02* (2006.01)
(Continued)

(52) U.S. Cl.
CPC ............. *H04N 1/6008* (2013.01); *G09G 3/02* (2013.01); *G09G 3/20* (2013.01); *H04N 1/6077* (2013.01);
(Continued)

(58) Field of Classification Search
CPC ...... H04N 1/6008; H04N 1/6077; H04N 9/31; H04N 9/3194; H04N 9/3164; G09G 3/02; G09G 3/20
See application file for complete search history.

(56) References Cited

U.S. PATENT DOCUMENTS

2014/0253527 A1    9/2014  Ogi et al.

FOREIGN PATENT DOCUMENTS

| JP | 2000-112429 A | 4/2000 |
|---|---|---|
| JP | 2006-252777 A | 9/2006 |

(Continued)

*Primary Examiner* — Abhishek Sarma
(74) *Attorney, Agent, or Firm* — Birch, Stewart, Kolasch & Birch, LLP

(57) ABSTRACT

An image display apparatus includes: a light source unit including three or more light sources, combining lights from the light sources and emitting the combined light; a wavelength detector that detects, for each light source, wavelength information indicating the wavelength of light from the light source; a color value determiner that determines, for each light source, from the wavelength information, a color value indicating a color of light from the light source in a predetermined color space; a correction value determiner that determines, based on the color values, a correction value for correcting a ratio between the intensities of lights from the light sources so that the color of the combined light is a color to be displayed; and a driver that drives the light sources so that the ratio between the intensities of lights from the light sources is a ratio corrected based on the correction value.

12 Claims, 11 Drawing Sheets

(51) Int. Cl.
*G09G 3/20* (2006.01)
*H04N 9/31* (2006.01)

(52) U.S. Cl.
CPC .............. *H04N 9/31* (2013.01); *H04N 9/3164* (2013.01); *H04N 9/3194* (2013.01)

(56) References Cited

FOREIGN PATENT DOCUMENTS

| | | |
|---|---|---|
| JP | 2007-156211 A | 6/2007 |
| JP | 2007-322866 A | 12/2007 |
| JP | 2008-192421 A | 8/2008 |
| JP | 2010-66465 A | 3/2010 |
| JP | 2010-237238 A | 10/2010 |
| JP | 2010-237309 A | 10/2010 |
| JP | 2014-59522 A | 4/2014 |
| JP | 2014-174292 A | 9/2014 |

IMAGE DISPLAY APPARATUS AND DISPLAY CORRECTION METHOD

TECHNICAL FIELD

The present invention relates to an image display apparatus and a display correction method.

BACKGROUND ART

In an image display apparatus that displays an image using lasers, the wavelengths of lights emitted from the lasers vary with temperature. Thus, the color of the displayed image varies with temperature. To address this, for example, a technique is used which maintains the temperatures of the lasers within predetermined ranges by heating or cooling the lasers using Peltier elements or the like, thereby reducing variation in color of the displayed image (see, for example, Patent Literature 1).

CITATION LIST

Patent Literature

Patent Literature 1: Japanese Patent Application Publication No. 2010-237238 (pages 3-5, and FIG. 1)

SUMMARY OF INVENTION

Technical Problem

However, in a configuration that prevents variations in wavelength of light sources by heating or cooling the light sources using temperature control elements, such as Peltier elements, there are problems, one of which is that the temperature control element consumes a large amount of power.

An object of the present invention is to provide an image display apparatus and a display correction method capable of reducing variation in color of a displayed image due to variations in wavelength of light from light sources.

Solution to Problem

An image display apparatus according to the present invention includes: a light source unit including three or more light sources that emit lights of different wavelengths, the light source unit combining the lights emitted from the three or more light sources and emitting the combined light; and a wavelength detector that detects, for each of the light sources, wavelength information indicating the wavelength of the light emitted from the light source, wherein the image display apparatus changes intensities of the lights from the light sources based on amounts of changes in the wavelengths detected by the wavelength detector, thereby adjusting a color of the light combined by the light source unit.

A display correction method according to the present invention is a display correction method for an image display apparatus including a light source unit including three or more light sources that emit lights of different wavelengths, the light source unit combining the lights emitted from the three or more light sources and emitting the combined light, the display correction method including: a wavelength detection step that detects, for each of the light sources, wavelength information indicating the wavelength of the light emitted from the light source; a color value determination step that determines, for each of the light sources, from the wavelength information of the light source detected by the wavelength detection step, a color value indicating a color of the light from the light source in a predetermined color space; a correction value determination step that determines, based on the color values of the lights from the respective light sources determined by the color value determination step, a correction value for correcting a ratio between intensities of the lights from the respective light sources so that a color of the light obtained by combining the lights from the respective light sources is a color to be displayed; and a driving step that drives the light sources so that the ratio between the intensities of the lights from the respective light sources is a ratio corrected based on the correction value determined by the correction value determination step.

Advantageous Effects of Invention

According to the present invention, it is possible to reduce variation in color of a displayed image while reducing power consumption.

DESCRIPTION OF EMBODIMENTS

Embodiments of the present invention will be described below with reference to the drawings.

First Embodiment

<Configuration of Image Display Apparatus>

Figure 1:
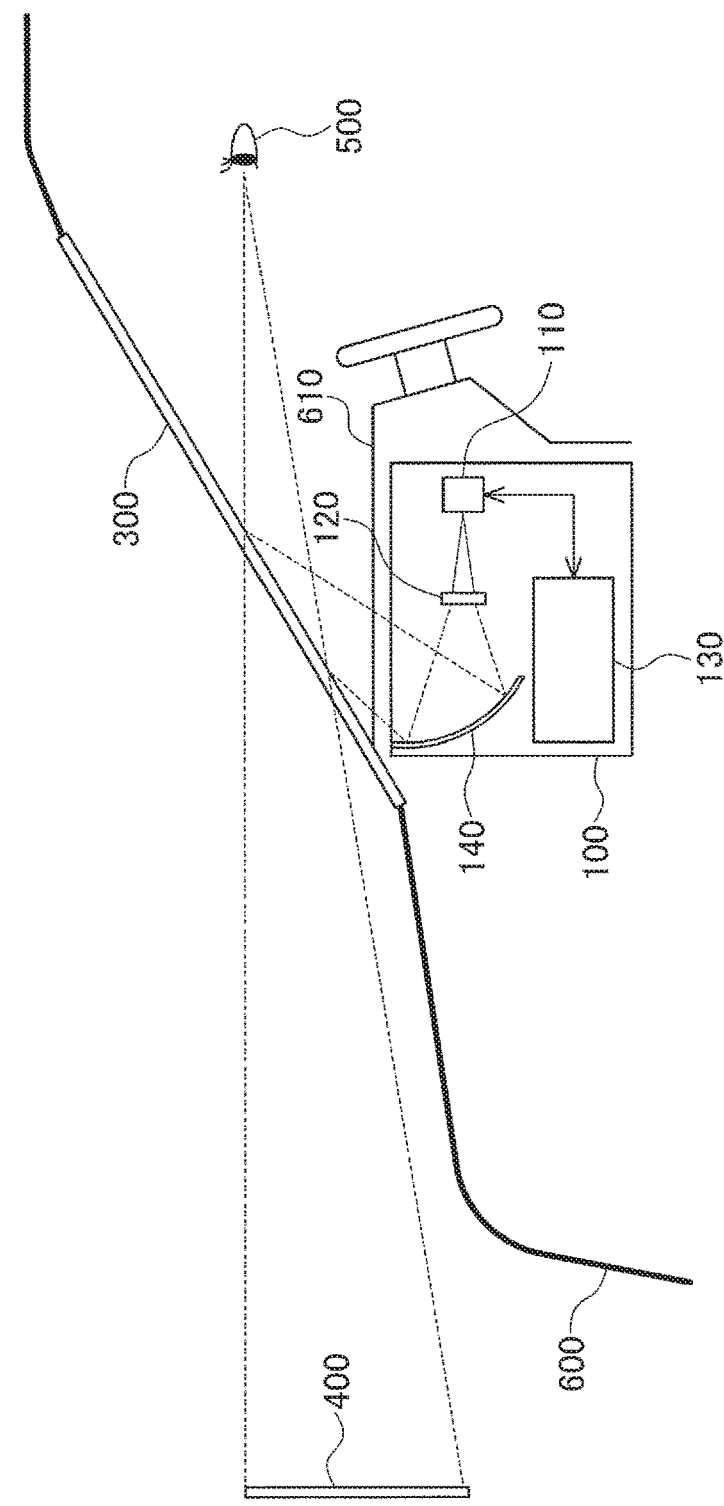
FIG. 1 is a schematic view illustrating an example of a configuration of an image display apparatus according to a first embodiment.

FIG. 1 is a schematic view illustrating an example of a configuration of an image display apparatus 100 according to a first embodiment. The image display apparatus 100 is an apparatus that displays an image by combining lights from three light sources. In the example of FIG. 1, the image display apparatus 100 is a head-up display for a vehicle. The image display apparatus 100 is mounted in a dashboard 610 of a vehicle 600.

In FIG. 1, the image display apparatus 100 includes a light source unit 110, a screen 120, a magnifying mirror 140, and a light source controller 130.

The light source unit 110 includes three light sources that emit lights having mutually different wavelengths. The light source unit 110 combines lights emitted from the three light sources and emits it.

Light emitted from the light source unit 110 is projected onto the screen 120, so that an image is imaged on the screen 120. Specifically, light from the light source unit 110 is two-dimensionally scanned, so that an image is displayed on a surface of the screen 120. Hereinafter, light that forms an image will be referred to as "image light." In the first embodiment, image light is formed by light scanned on the screen 120. The screen 120 is, for example, a transmissive screen. The screen 120 transmits image light incident from the light source unit 110 side and emits it to the magnifying mirror 140 side.

The magnifying mirror 140 magnifies and projects an image imaged on the screen 120. The magnifying mirror 140 has a reflecting surface (concave surface) having negative power. The magnifying mirror 140 projects image light emitted from the screen 120 toward a windshield (or front window) 300. Thereby, an image imaged on the screen 120 is magnified by the magnifying mirror 140.

A combiner may be used in place of the windshield, "Combiner" refers to a translucent screen disposed on a front window side. Driving information is caused to be reflected by the combiner and enter a field of view of a driver.

The windshield is a transmissive display unit that reflects image light from the image display apparatus 100 and allows the driver to view the landscape in front of the vehicle.

An image imaged on the screen 120 is displayed as a virtual image 400 in front of the windshield 300 as viewed from the driver 500, who is a viewer. The driver 500 sees the image projected by the magnifying mirror 140 as the virtual image 400 with it superimposed on the landscape in front of the windshield 300. The reflecting surface of the magnifying mirror 140 is formed, for example, as a free-form surface to correct image distortion due to curvature of the windshield 300.

In FIG. 1, image light from the screen 120 is reflected only by the magnifying mirror 140 and projected onto the windshield 300. However, the configuration from the screen 120 to the windshield 300 is not limited to this. The configuration may be changed appropriately in consideration of a space in the dashboard 610 or the sizes of optical components. For example, it is possible to employ a configuration in which image light from the screen 120 is reflected multiple times. Further, the screen 120 is not limited to a transmissive screen and may be a reflective screen.

The light source controller 130 controls the light source unit 110 to emit image light corresponding to an image to be displayed.

<Configuration of Light Source Unit>

Figure 2:
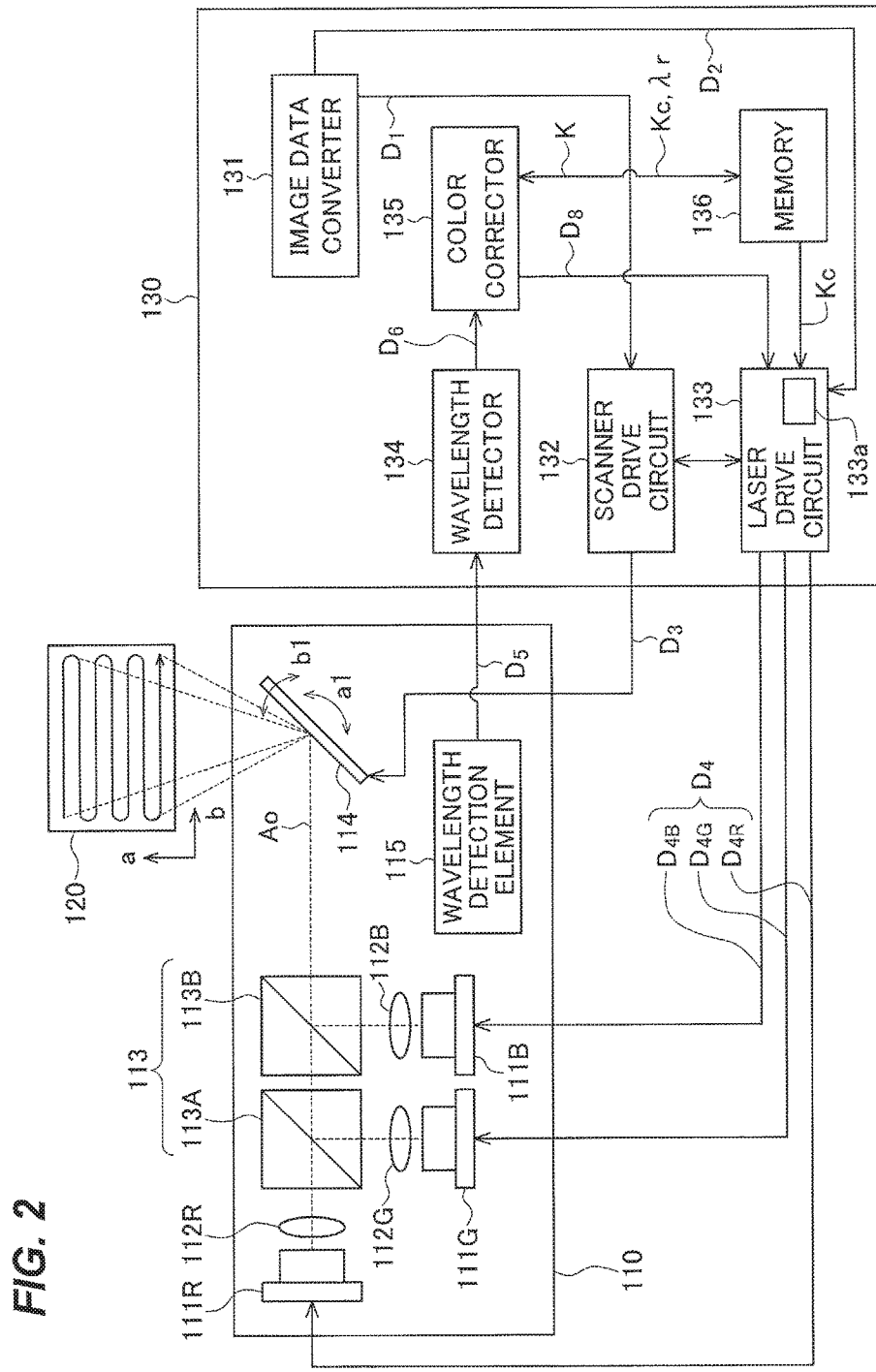
FIG. 2 is a schematic diagram illustrating an exemplary configuration of a light source unit and a light source controller of the image display apparatus according to the first embodiment.

FIG. 2 is a-schematic diagram illustrating an exemplary configuration of the light source unit 110 and light source controller 130 of the image display apparatus 100. The configuration of the light source unit 110 of the image display apparatus 100 will be described below with reference to FIG. 2.

In FIG. 2, the light source unit 110 includes semiconductor lasers (referred to below simply as "lasers") 111R, 111G, and 111B, collimator lenses 112R, 112G, and 112B, a combiner 113, a scanner 114 and a wavelength detection element 115.

The lasers 111R, 111G, and 111B respectively emit red (R), green (G), and blue (B) wavelength laser lights. Hereinafter, the lasers 111R, 111G, and 111B may be referred to collectively as the lasers 111, and an arbitrary one of the lasers may be referred to as a laser 111.

The collimator lenses 112R, 112G, and 112B are provided corresponding to the lasers 111R, 111G, and 111B, respectively. Each of the collimator lenses 112R, 112G, and 112B converts a divergence angle of laser light emitted from the corresponding laser 111. Hereinafter, the collimator lenses 112R, 112G, and 112B may be referred to collectively as the collimator lenses 112, and an arbitrary one of the collimator lenses may be referred to as a collimator lens 112.

The combiner 113 combines, mixes, or color-mixes laser lights emitted from the Lasers 111R, 111G, and 111B into laser light on a common optical axis Ao.

The scanner 114 two-dimensionally scans the screen 120 with laser light combined by the combiner 113 on the common optical axis Ao.

The wavelength detection element 115 is a sensor for detecting wavelengths $\lambda aR$, $\lambda aG$, and $\lambda aB$ of the respective lasers 111R, 111G, and 111B.

Hereinafter, light obtained by combining laser lights emitted from the lasers 111R, 111G, and 111B will be referred to as "combined light," The color displayed by combined light will be referred to as the "displayed color."

In the exemplary configuration illustrated in FIG. 2, the laser 111R is disposed so that an optical axis of light emitted by the laser 111R is parallel to the optical axis Ao. Each of the lasers 111G and 111B is disposed so that an optical axis of light emitted by the laser is perpendicular to the optical axis Ao.

The collimator lenses 112R, 112G, and 112B respectively convert laser lights emitted from the lasers 111R, 111G, and 111B into parallel lights.

The combiner 113 includes prisms 113A and 113B.

The prism 113A reflects, by 90 degrees, green laser light from the laser 111G. The prism 113A transmits red laser light from the laser 111R. The prism 113A is a selectively transmitting and reflecting prism.

The prism 113B reflects, by 90 degrees, blue laser light from the laser 111B. The prism 113B transmits red laser light passing through the prism 113A and green laser light reflected by the prism 113A. The prism 113B is a selectively transmitting and reflecting prism.

"Selectively transmitting and reflecting prism" refers to a prism that selectively transmits or reflects light depending on the wavelength, polarization, or the like. The first embodiment describes an example in which the prisms 113A and 113B selectively transmit or reflect light depending on the wavelength.

The prisms 113A and 113B combine red, green, and blue wavelength laser lights. The combined laser light is a laser beam on the common optical axis Ao. The combined laser light is emitted toward the scanner 114.

The scanner 114 includes, for example, a micro-electromechanical systems (MEMS) mirror, a galvanometer mirror, or the like. The scanner 114 receives laser light combined by the prisms 113A and 1133 on the single optical axis Ao.

The scanner 114 turns in the directions of arrows a1 and b1 in FIG. 2. The scanner 114 swings in the directions of arrows a1 and b1 in FIG. 2. The scanner 114 two-dimensionally scans incident light on the screen 120 in a horizontal direction (the direction of arrow a in FIG. 2) and a vertical direction (the direction of arrow b in FIG. 2). Thereby, the scanner 114 forms an image on the screen 120. FIG. 2 shows a side of the screen 120 on which light from the scanner 114 is incident.

The configuration of the light source unit 110 is not limited to the example illustrated in FIG. 2. For example, the combiner 113 may combine and emit lights of the respective colors using a dichroic mirror or the like.

<Configuration of Light Source Controller>

A configuration of the light source controller 130 of the image display apparatus 100 will be described below with reference to FIG. 2.

In FIG. 2, the light source controller 130 includes an image data converter 131, a scanner drive circuit 132, a laser drive circuit (also referred to simply as the driver) 133, a wavelength detector 134, a color corrector 135, and a memory (or storage unit) 136.

The image data converter 131 receives image signal data representing an image to be displayed. The image data converter 131 can receive image signal data generated in the image display apparatus 100. A component that generates the image signal data in the image display apparatus 100 is, for example, the light source controller 130. The image data converter 131 can also receive image signal data generated by a device external to the image display apparatus 100. The device external to the image display apparatus 100 is, for example, a controller of the vehicle 600, a navigation system, or the like.

The image data converter 131 sends, based on the received image signal data, a control signal $D_1$ for controlling the scanner 114 to the scanner drive circuit 132. The image data converter 131 also sends, based on the image signal data, a control signal 32 for controlling the lasers 111R, 111G, and 111B to the laser drive circuit 133.

The scanner drive circuit 132 sends, based on the control signal $D_1$ from the image data converter 131, a drive signal $D_3$ for driving the scanner 114 to the scanner 114. The scanner 114 scans laser light in accordance with the drive signal $D_3$ from the scanner drive circuit 132.

The laser drive circuit 133 sends, based on the control signal $D_2$ from the image data converter 131, a drive signal $D_4$ for driving the lasers 111R, 111G, and 111B to the laser 111R, 111G, and 111B. The lasers 111R, 111G, and 111B emit laser light in accordance with the drive signal $D_4$ from the laser drive circuit 133. The laser drive circuit 133 sends a drive signal $D_{4R}$ to the laser 111R. The laser drive circuit 133 sends a drive signal $D_{4G}$ to the laser 111G. The laser drive circuit 133 sends a drive signal $D_{4B}$ to the laser 111B.

The transmission of the drive signal $D_3$ from the scanner drive circuit 132 and the transmission of the drive signal $D_4$ from the laser drive circuit 133 are controlled so that scanning of laser light by the scanner 114 and emission of laser light by the light source unit 110 are synchronized with each other.

The wavelength detector 134 detects, for each of the lasers 111, wavelength information indicating the wavelength of laser light emitted from the laser 111. Specifically, the wavelength detector 134 receives a detection signal $D_5$ from the wavelength detection element 115. The wavelength detector 134 then determines, based on the received detection signal $D_5$, wavelengths λaR, λaG, and λaB of laser lights emitted by the respective lasers 111R, 111G, and 111B. Hereinafter, the wavelengths λaR, λaG, and λaB may be referred to collectively as the wavelengths λa, and an arbitrary one of the wavelengths may be referred to as a wavelength λa.

Figure 3:
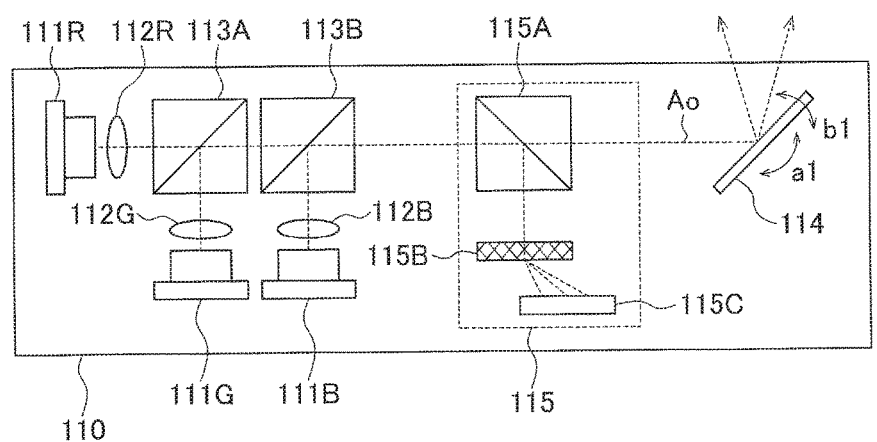
FIG. 3 is a schematic diagram illustrating a first example of a wavelength detection element in the first embodiment.

FIG. 3 is a schematic diagram illustrating a first example of the wavelength detection element 115.

In the first example, the wavelength detection element 115 includes a prism 115A, a hologram element 115B, and a detector 115C.

The prism 115A reflects part of laser light from the prism 113B to cause it to be incident on the hologram element 115B. The hologram element 115B diffracts the incident light to cause it to be incident on the detector 115C. The diffraction angle of the hologram element 115B varies with the wavelength λa of light incident on the hologram element 115B. That is, the hologram element 115B emits light at different diffraction angles depending on the wavelength λa of the incident light.

Thus, the position at which laser light is incident on the detector 115C shifts depending on the wavelength λa of the laser light incident on the hologram element 115B. The detector 115C includes multiple detecting portions arranged in an array. The detector 115C can detect the position at which light is incident on the detector 115C. That is, the detector 115C can detect which position on the detector 115C receives the laser light.

The detected incident position indicates the angle of diffraction by the hologram element 115B. Thus, the detected incident position indicates the wavelength λa of the laser light.

The detector 115C sends a detection signal $D_5$ indicating the detected incident position to the wavelength detector 134. The wavelength detector 134 determines, based on the detection signal $D_5$ from the detector 115C, the wavelength λa of the laser light.

In wavelength detection, for example, the wavelength detector 134 causes only one of the lasers 111 to emit light without causing the other lasers 111 to emit light, and detects the wavelength λa of the one laser 111 caused to emit light.

Figure 4:
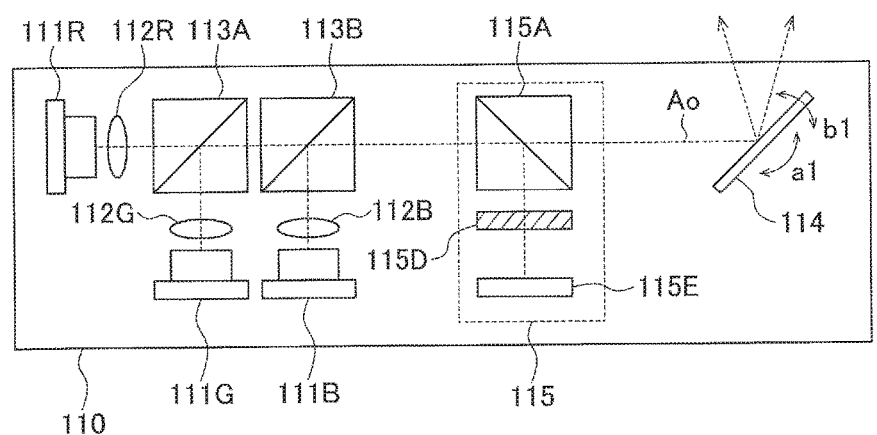
FIG. 4 is a schematic diagram illustrating a second example of the wavelength detection element in the first embodiment.

FIG. 4 is a schematic diagram illustrating a second example of the wavelength detection element 115.

In the second example, the wavelength detection element 115 includes a prism 115A, a wavelength filter 115D, and a detector 115E.

The prism 115A reflects part of laser light from the prism 113B to cause it to be incident on the wavelength filter 115D. The wavelength filter 115D transmits the incident light to cause it to be incident on the detector 115E.

The wavelength filter 115D has a wavelength-dependent transmission characteristic. The transmittance of the wavelength filter 115D depends on the wavelength. λa of light incident on the wavelength filter 115D.

Figure 5:
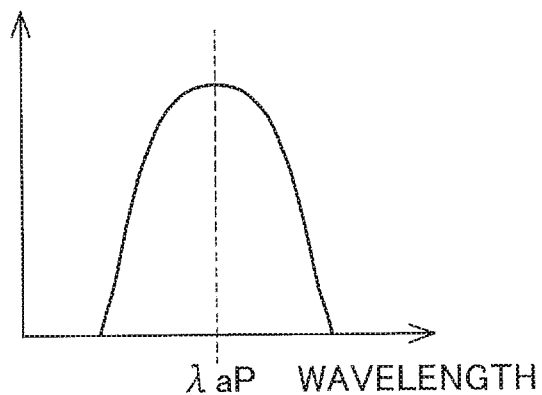
FIG. 5 is a diagram illustrating an example of a transmission characteristic of a wavelength filter in the second example of the wavelength detection element.

FIG. 5 is a diagram illustrating an example of the transmission characteristic of the wavelength filter 115D. In FIG. 5, the horizontal axis represents wavelength, and the vertical axis represents transmittance. In the example of the transmission characteristic of the wavelength filter 115D in FIG. 5, the transmittance is maximum at a wavelength λaP. The transmittance decreases symmetrically on the long and short wavelength sides of the wavelength λaP.

The detector 115E receives the laser light passing through the wavelength filter 115D. The detector 115E then sends a detection signal $D_5$ indicating the amount of the received laser light, to the wavelength detector 134. The wavelength detector 134 determines, based on the detection signal from the detector 115E, the wavelength λa of the laser light.

The wavelength detector 134 calculates the wavelength λa of the laser light, from the detection signal $D_5$ from the detector 115E, based on information indicating the transmission characteristic of the wavelength filter 115D.

In wavelength detection, for example, the wavelength detector 134 causes only one of the lasers 111 to emit light without causing the other lasers 111 to emit light, and detects the wavelength of the one laser 111 caused to emit light. Also, in wavelength detection, for example, the power (or intensity) of the laser light emitted from the laser 111 is regulated at a predetermined value for wavelength detection.

Figure 6:
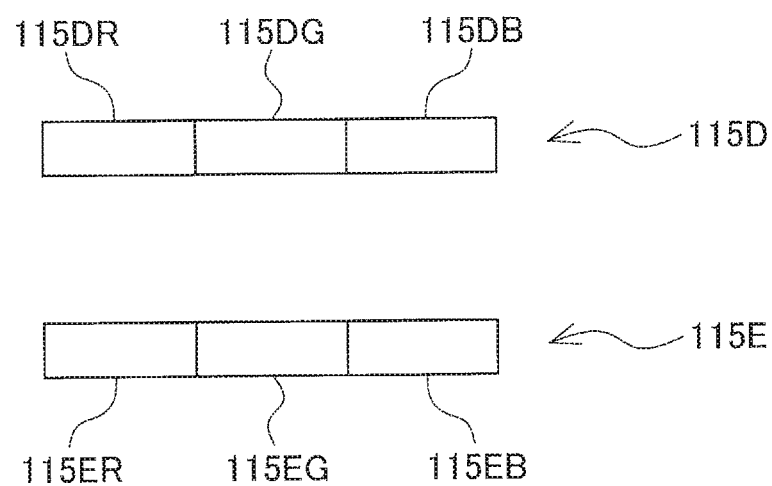
FIG. 6 is a schematic diagram illustrating a modification of the wavelength filter and a detector in the second example of the wavelength detection element.

In the above second example, the wavelength filter 115D and detector 115E may be configured as illustrated in FIG. 6. FIG. 6 is a schematic diagram illustrating a modification of the wavelength filter 115D and detector 115E.

In FIG. 6, the wavelength filter 115D includes filters 115DR, 115DG, and 115DB sensitive to red, green, and blue wavelength lights, respectively. The filter 115DR is sensitive to red wavelength light. The filter 115DG is sensitive to green wavelength light. The filter 115DB is sensitive to blue wavelength light.

The three filters 115DR, 115DG, and 115DB are arranged to divide a spot (or light beam) of laser light incident on the wavelength filter 115D into three parts.

The detector 115E includes detectors 115ER, 115EG, and 115EB corresponding to the filters 115DR, 115DG, and 115DB. The detector 115ER corresponds to the filter 115DR. The detector 115EG corresponds to the filter 115DG. The detector 115EB corresponds to the filter 115DB.

The detectors 115ER, 115EG, and 115EB are arranged to receive laser light passing through the corresponding filters 115DR, 115DG, and 115DB, respectively.

In the above first and second examples, light emitted from the combiner 113 is used for detection of the wavelengths λa. However, this is not mandatory.

For example, for detection of the wavelengths λa, lights that have been emitted from the lasers 111R, 111G, and 111B and have not been incident on the collimator lenses 112R, 112G, and 112B may be used. Lights that have been emitted from the collimator lenses 112R, 112G, and 112B and have not been incident on the prisms 113A and 113B may also be used.

Figure 7:
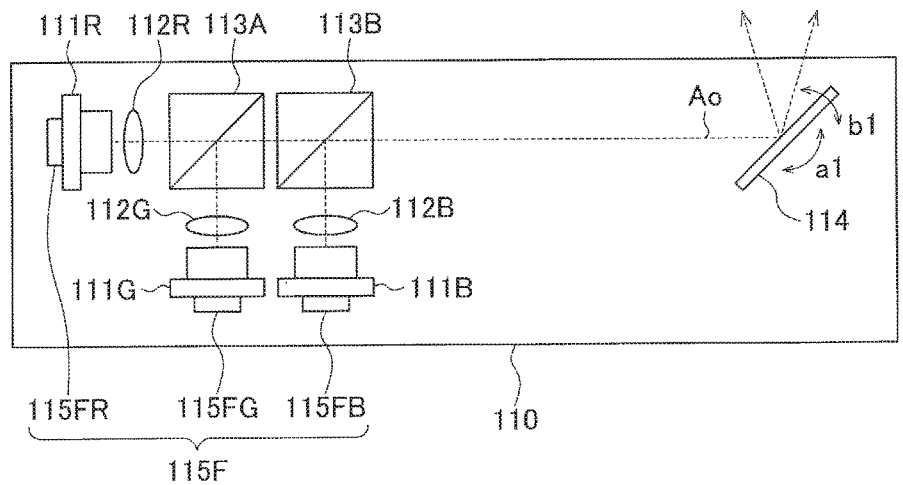
FIG. 7 is a schematic diagram illustrating a third example of the wavelength detection element in the first embodiment.

FIG. 7 is a schematic diagram illustrating a third example of the wavelength detection element 115.

In the third example, the wavelength detection element 115 includes temperature measurement elements 115FR, 115FG, and 115FB. The temperature measurement elements 115FR, 115FG, and 115FB may be referred to collectively as the temperature measurement elements 115F, and an arbitrary one of the temperature measurement elements may be referred to as a temperature measurement element 115F.

The temperature measurement elements 115FR, 115FG, and 115FB measure temperatures TR, TG, and TB of the lasers 111R, 111G, and 111B, respectively. The temperature measurement element 115FR measures the temperature TR of the laser 111R. The temperature measurement element 115FG measures the temperature TG of the laser 111G. The temperature measurement element 115FB measures the temperature TB of the laser 111B. The temperatures TR, TG, and TB may be referred to collectively as the temperatures T, and the temperature of an arbitrary one of the lasers 111 may be referred to as a temperature T.

The temperature measurement elements 115FR, 115FG, and 115FB send the wavelength detector 134 voltage values (a detection signal $D_5$) indicating the temperatures TR, TG, and TB of the lasers 111R, 111G, and 111B, respectively. The wavelength detector 134 determines, based on the detection signal E) from the detectors 115F, the wavelengths λa of the laser lights.

Here, each of the temperature measurement elements 115FR, 115FG, and 115FB is, for example, a thermistor, whose resistance varies with temperature. Each of the temperature measurement elements 115FR, 115FG, and 115FB preferably measures, as the temperature T of the laser 111, a temperature of a package of the laser 111. However, each of the temperature measurement elements 115FR, 115FG, and 115FB may measure an ambient temperature around the laser 111.

The wavelength detector 134 determines the temperatures TR, TG, and TB of the respective lasers 111R, 111G, and 111B, from the voltage values (detection signal D) from the respective temperature measurement elements 115FR, 115FG, and 115FB, based on information indicating a predetermined relationship between the temperature and the voltage value.

Further, the wavelength detector 134 determines, for each of the lasers 111R, 111G, and 111B, the wavelength. λa from the temperature T of the laser 111 based on information indicating a predetermined relationship between the temperature T and the wavelength λa of the laser 111.

The information indicating the relationship between the temperature T and the wavelength λa of the laser 111 indicates, for example, the rate (nm/deg) of change in the wavelength with respect to the temperature and the wavelength (nm) of the laser at a certain temperature. Such information is obtained from, for example, the specifications or actual measured data of the laser. In general, the temperature dependency of laser wavelength is about 0.2 nm/deg for red lasers, and about 0.02 nm/deg for green and blue lasers. However, it depends on the material of the laser and other factors.

In the above third example, the temperatures TR, TG, and TB of the respective lasers 111R, 111G, and 111B are measured. However, in a configuration in which the temperatures T of the respective lasers 111 are equal, it is possible to measure a temperature representing the temperatures T of the respective lasers 111 at a single position, and calculate the wavelengths of the respective lasers 111 from the temperature measured at the single position.

Referring again to FIG. 2, the color corrector 135 receives wavelength information $D_6$ of the respective lasers 111 detected by the wavelength detector 134. The color corrector 135 determines, based on the wavelength information $D_6$ of the respective lasers 111 detected by the wavelength detector 134, a correction value for correcting the color (or displayed color) of the combined light so that variation in the color of the combined light due to variations in the wavelengths λa of the respective lasers 111 is reduced.

The memory 136 stores a variety of information used for processing by the light source controller 130.

<Configuration of Color Corrector>

Figure 8:
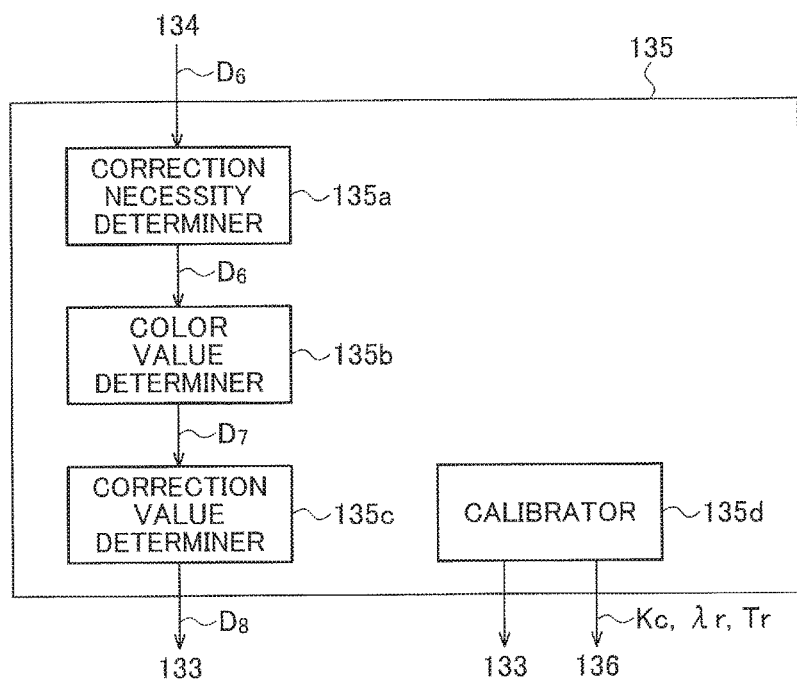
FIG. 8 is a block diagram illustrating a configuration of a color corrector in the first embodiment.

FIG. 8 is a block diagram illustrating a configuration of the color corrector 135. The configuration of the color corrector 135 will be described below with reference to FIG. 8.

In FIG. 8, the color corrector 135 includes a correction necessity determiner 135a, a color value determiner 135b, and a correction value determiner 135c.

The correction necessity determiner 135a determines whether correction by a correction value is required. Specifically, the correction necessity determiner 135a determines, based on the wavelength information $D_6$ detected by the wavelength detector 134, whether correction is required.

When the correction necessity determiner 135a determines that the correction is required, the color value determiner 135b determines, for each of the lasers 111, from the wavelength information $D_6$ of the laser 111 detected by the wavelength detector 134, a color value (also referred to as chromaticity or color coefficient) C indicating the color of light from the laser 111 in a predetermined color space.

In the first embodiment, the color value determiner 135b determines, as each of the color values, tristimulus values (i.e., an XYZ value consisting of X, Y, and Z values) in an XYZ color system. In the XYZ color system, a color is represented by tristimulus values of an object color due to reflection, and characteristics as to the mixture ratio of a mixture of the XYZ primary stimuli that looks the same color as monochromatic light of a certain wavelength are defined as color matching functions.

Some color values will be denoted as follows.
(1) The color value of a reference white of combined light in the XYZ color system will be denoted by CW. The color value CW is the color value of combined light.
(2) The color values of the respective laser lights determined by the color value determiner 135b will be denoted by Ca (CaR, CaG, CaB).
(3) The color value of combined light obtained by combining lights having the color values Ca will be denoted by Cai.
(4) The color values of the respective laser lights corresponding to reference wavelengths λrR, λrG, and λrB will be denoted by Cr (CrR, CrG, CrB).
(5) The color value of combined light obtained by combining lights having the color values Cr will be denoted by Cri.
(6) The color values of laser lights emitted from the respective lasers 111 will be denoted by C (CR, CG, CB). The color values C includes the color values Ca and Cr.
(7) The color value of combined light obtained by combining lights having the color values C will be denoted by Ci.

In the first embodiment, for example, single mode lasers having narrow wavelength spectrum widths are used as the lasers 111R, 111G, and 111B. The color value determiner 135b determines, from color matching functions, the color value CR (XaR, YaR, ZaR) corresponding to the wavelength λaR of the laser 111R, the color value CG (XaG, YaG, ZaG) corresponding to the wavelength XaG of the laser 111G, and the color value CB (XaB, YaB, ZaB) corresponding to the wavelength λaB of the laser 111B.

The color value determiner 135b receives the wavelength information $D_8$ from the correction necessity determiner 135a.

For example, the color value determiner 135b previously stores a table in which wavelengths are associated with color values and that indicates color matching functions. The color value determiner 135b extracts, from the previously stored table, color values $D_7$ (color values Ca) corresponding to the wavelengths λa of the respective lasers 111. Alternatively, for example, the color value determiner 135b calculates, by previously stored calculation formulae of color matching functions, color values $D_7$ (color values Ca) corresponding to the wavelengths λa of the respective lasers 111.

The correction value determiner 135c determines, based on the color values $D_7$ (color values Ca) of lights from the respective lasers 111 determined by the color value determiner 135b, a correction value $D_8$ for correcting the ratio between the powers of lights emitted from the respective lasers 111 so that the color of light (combined light) obtained by combining lights from the respective lasers 111 is a color to be displayed.

In another aspect, the correction value determiner 135c determines, based on the color values $D_7$ (color values Ca) of lights from the respective lasers 111 determined by the color value determiner 135b, a correction value $D_8$ so that the color of combined light when white is displayed (i.e., combined light corresponding to white) is a predetermined reference white.

In another aspect, the correction value determiner 135c determines, based on the color values $D_7$ (color values Ca) of lights from the respective lasers 111 determined by the color value determiner 135b, a correction value $D_B$ so that variation in the color of combined light due to variations in the wavelengths λa of the respective laser lights is compensated or cancelled. The correction value determiner 135c sends the determined correction value $D_8$ to the laser drive circuit 133.

The laser drive circuit 133 corrects, based on the correction value $D_8$ determined by the color corrector 135, the ratio between the powers (or intensities) of laser lights emitted from the respective lasers 111, thereby correcting the displayed color. The laser drive circuit 133 drives the lasers 111 so that the ratio between the intensities of lights from the respective lasers 111 is a ratio corrected based on the correction value $D_8$ determined by the color corrector 135.

Specifically, the laser drive circuit 133 receives image data (a control signal $D_2$) representing an image to be displayed. The laser drive circuit 133 corrects, based on the correction value $D_8$ determined by the color corrector 135, the ratio between intensities of lights from the respective lasers 111 indicated by the received image data (control signal $D_2$). The laser drive circuit 133 drives the lasers 111 to emit lights at the corrected intensity ratio.

The laser drive circuit 133 drives the lasers 111 so that the intensities of lights from the respective lasers 111 are intensities corrected based on the correction value $D_8$ determined by the color corrector 135.

Specifically, the laser drive circuit 133 receives image data (a control signal $D_2$) representing an image to be displayed. The laser drive circuit 133 corrects, based on the correction value $D_8$ determined by the color corrector 135, intensities of lights from the respective lasers 111 indicated by the received image data (control signal $D_2$) The laser drive circuit 133 drives the lasers 111 to emit lights having the corrected intensities.

The image data is, for example, included in the control signal $D_2$ from the image data converter 131. The image data is specifically grayscale values corresponding to the respective lasers 111. For example, the image data is RGB data described later.

In the following description, determining a correction value $D_8$ and correcting the displayed color based on the correction value $D_8$ will be referred to as "color correction."

<Process in Displaying Image and Color Correction>

A process when an image is displayed and color correction will be described in detail below.

The image data converter 131 sends, based on image signal data of an image to be displayed, for each of pixels constituting the image, a red grayscale value (R value) IR corresponding to the laser 111R, a green grayscale value (G value) IG corresponding to the laser 111G, and a blue grayscale value (B value) IB corresponding to the laser 111B, to the laser drive circuit 133.

That is, the image data converter 131 sends, based on image signal data of an image to be displayed, grayscale values (R values) IR, grayscale values (G values) IG, and grayscale values (B values) IB, to the laser drive circuit 133. The grayscale values IR are red grayscale values corresponding to the laser 111R. The grayscale values IG are green grayscale values corresponding to the laser 111G. The grayscale values IB are blue grayscale values corresponding to the laser 111B. For each of the pixels constituting the image to be displayed, grayscale values IR, IG, and IL) are sent to the laser drive circuit 133. Grayscale values IR, IG, and IB may be referred to collectively as grayscale values I, and an arbitrary one of the grayscale values may be referred to as a grayscale value I. The same applies to a case where the colors of the lights are not RGB. The grayscale values I is included in a control signal $D_2$.

Specifically, the image data converter 131 generates, from the image signal data, for each pixel, RGB data including grayscale values IR, IG, and IB. The image data converter 131 then sends a control signal $D_2$ including the RGB data for each pixel, to the laser drive circuit 133.

Here, each grayscale value is 8-bit data. RGB data is 24-bit data. In this case, RGB data can represent 256^3 ($256^3$) colors.

RGB data represents black when all the three grayscale values take their minimum values (0) (i.e., when IR=IG=IB=0). Also, RGB data represents white when all the three grayscale values take their maximum values (255) (i.e., when IR=IG=IB=255).

When the three grayscale values have different values, the RGB data represents a color obtained by adding and mixing red, green, and blue at the ratio (IR:IG:IB) between the three grayscale values IR, IG, and IB.

The above is an example, and image data including RGB data in a format different from the above may be used. For example, the number of bits allocated to each grayscale value is not limited to the above.

The laser drive circuit 133 supplies, based on the control signal $D_2$ from the image data converter 131, the respective lasers 111R, 111G, and 111B with drive signals $D_{4R}$, $D_{4G}$, $D_{4B}$ indicating output powers (or output intensities) that are powers (or intensities) of lights to be emitted by the respective lasers 111.

Specifically, the laser drive circuit 133 receives, for each of the pixels of the image to be displayed, the grayscale values IR, IG, and IB from the image data converter 131. The laser drive circuit 133 then multiplies the grayscale values IR, IG, and IB by output coefficients KR, KG, and KB to determine output powers PR, PG, and PB of the lasers 111R, 111G, and 111B, respectively, as in the following equations (1).

$PR = KR \cdot IR$ $PG = KG \cdot IG$ $PB = KB \cdot IB$ \hfill (1)

The output powers PR, PG, and PB may be referred to collectively as the output powers P, and an arbitrary one of the output powers may be referred to as an output power P.

Here, the output coefficients KR, KG, and KB are coefficients for determining the output powers of the lasers 111R, 111G, and 111B, respectively. Also, the output coefficients KR, KG, and KB are coefficients for adjusting the ratio between the output powers PR, PG, and PB of the respective lasers 111R, 111G, and 111B. The output coefficients KR, KG, and KB are set or adjusted so that when the RGB data represents white (or when IR=IG=IB=255), the color of the laser light emitted from the light source unit 110 is a desired reference white. The output coefficients KR, KG, and KB may be referred to collectively as the output coefficients K, and an arbitrary one of the output coefficients may be referred to as an output coefficient K.

In the example of FIG. 2, the output coefficients KR, KG, and KB are stored in an output coefficient memory 133a in the laser drive circuit 133.

The laser drive circuit 133 supplies drive signals $D_{4R}$, $D_{4G}$, and $D_{4B}$ corresponding to the determined output powers PR, PG, and PB to the lasers 111R, 111G, and 111B, respectively.

The lasers 111R, 111G, and 111B emit laser lights having powers corresponding to the drive signals $D_{4R}$, $D_{4G}$, and $D_{4B}$ supplied from the laser drive circuit 133. The laser lights emitted from the lasers 111R, 111G, and 111B are combined and caused to illuminate the screen 120.

Here, when it is assumed that the color value CR of the laser light emitted from the laser 111B is (XR, YR, ZR), the color value CG of the laser light emitted from the laser 111G is (XG, YG, ZG), and the color value CB of the laser light emitted from the laser 111E is (XB, YB, ZB), the color value Ci (X1, Y1, Z1) of the combined light is represented by the following equations (2).

$X1 = XR \cdot KR \cdot IR + XG \cdot KG \cdot IG + XB \cdot KB \cdot IB$ $Y1 = YR \cdot KR \cdot IR + YG \cdot KG \cdot IG + YB \cdot KB \cdot IB$ $Z1 = ZR \cdot KR \cdot IR + ZG \cdot KG \cdot IG + ZB \cdot KB \cdot IB$ \hfill (2)

Variations in the temperatures T of the respective lasers 111 shifts the wavelengths λa of the respective laser lights. This varies the color values CR (XR, YR, ZR), CG (XG, YG, ZG), and CB (XE, YB, ZB) of the respective laser lights. That is, the color values CR, CG, and CB of the respective laser lights vary. Thus, if the output coefficients KR, KG, and KB are fixed values, the color value Ci (X1, Y1, Z1) of the combined light varies with the temperatures T. The variation in the color value Ci of the combined light obtained from the respective laser lights having the color values C indicates variation in the displayed color. The color values CR, CG, and CB may be referred to collectively as the color values C, and an arbitrary one of the color values may be referred to as a color value C.

From a viewpoint of reducing the variation in the displayed color, in the first embodiment, the light source controller 130 detects the color values CR, CG, and CB of the respective laser lights. The light source controller 130 then corrects the output coefficients KR, KG, and KB based on the detected color values CR, CG, and CB of the respective laser lights so that the color of the combined light is a color to be displayed.

Specifically, in color calibration, reference output coefficients (also referred to as output coefficients after calibration) KcR, KcG, and KcB are determined. Then, when an image is displayed, values obtained by multiplying the reference output coefficients KcR, KcG, and KcB by correction coefficients (also referred to as laser output correction amounts) αR, αG, and αB determined based on the wavelength information are used as the output coefficients KR, KG, and KB, as in the following equations (3). The correction coefficients αR, αG, and αB may be referred to collectively as the correction coefficients α, and an arbitrary one of the correction coefficients may be referred to as a correction coefficient α.

$$KR = \alpha R \cdot KcR$$

$$KG = \alpha G \cdot KcG$$

$$KB = \alpha B \cdot KcB \quad (3)$$

In FIG. 2, the memory 136 stores the reference output coefficients KcR, KcG, and KcB previously determined in the color calibration. The color calibration is performed, for example, before shipment of the image display apparatus 100.

The color corrector 135 determines, as the correction value $D_8$, correction coefficients αR, αG, and αB for correcting the reference output coefficients KcR, KcG, and KcB. The color corrector 135 then sends the correction coefficients αR, αG, and αB to the laser drive circuit 133. The reference output coefficients KcR, KcG, and KcB may be referred to collectively as the reference output coefficients Kc, and an arbitrary one of the reference output coefficients may be referred to as a reference output coefficient Kc.

The laser drive circuit 133 corrects, based on the correction coefficients αR, αG, and αB received from the color corrector 135, the reference output coefficients KcR, KcG, and KcB stored in the memory 136 to output coefficients αR·KcR, αG·KcG, and αB·KcB. From equations (3), αR·KcR is the output coefficient KR. αG·KcG is the output coefficient KG. αB·KcB is the output coefficient KB.

Using these corrected output coefficients K, the laser drive circuit 133 determines the output powers P of the respective lasers 111. The laser drive circuit 133 then supplies the lasers 111 with a drive signal $D_4$ according to the determined output powers P.

Specifically, the laser drive circuit 133 calculates, from the reference output coefficients KcR, KcG, and KcB, and the correction coefficients αR, αG, and αB, according to the above equations (3), the output coefficients KR, KG, and KB. The laser drive circuit 133 then stores the output coefficients KR, KG, and KB in the output coefficient memory 133a.

The laser drive circuit 133 then determines, for each of the pixels of the image to be displayed, from the grayscale values IR, IG, and IB, and the output coefficients KR, KG, and KB stored in the output coefficient memory 133a, according to the following equations (4), the output powers PR, PG, and PB of the lasers 111R, 111G, and 111B.

$$PR = KR \cdot IR = \alpha R \cdot KcR \cdot IR$$

$$PG = KG \cdot IG = \alpha G \cdot KcG \cdot IG$$

$$PB = KB \cdot IB = \alpha B \cdot KcB \cdot IB \quad (4)$$

<Color Calibration>

The color calibration will be described in detail below.

In the color calibration, while RGB data indicating white (RGB data in which IR=IG=IB=255) is supplied to the laser drive circuit 133 and the lasers 111 are caused to emit light, the output coefficients KR, KG, and KB are adjusted so that the color of the combined light is a predetermined reference white. Then, the adjusted output coefficients are stored in the memory 136 as the reference output coefficients KcR, KcG, and KcB.

Further, in the color calibration, the wavelengths λaR, λaG, and λaB of the lights from the lasers 111R, 111G, and 111B when the reference output coefficients KcR, KcG, and KcB are obtained are measured. Then, in the color calibration, the measured wavelengths λaR, λaG, and λaB are stored in the memory 136 as reference wavelengths λrR, λrG, and λrB, respectively.

Further, in the color calibration, the temperatures TR, TG, and TB of the lasers 111R, 111G, and 111B when the reference output coefficients KcR, KcG, and KcB are obtained may be measured by thermistors or the like. Then, in the color calibration, the measured temperatures TR, TG, and TB may be stored in the memory 136 as reference temperatures TrR, TrG, and TrB, respectively.

In the first embodiment, for example, the above reference white is a white having a color temperature of 6500 K (Kelvin), which is often used as a reference in image display apparatuses.

In a specific example, as illustrated in FIG. 8, the color corrector 135 includes a calibrator 135d for calibrating the color of the combined light.

Upon receiving a calibration start command from a calibration operator, the calibrator 135d supplies the laser drive circuit 133 with RGB data indicating white and initial values of the output coefficients K. The RGB data indicating white is data in which all the three grayscale values are the maximum values (255). The calibration operator is, for example, a person who adjusts the image display apparatus 100 in the factory before shipment, or a person who views an image on the image display apparatus 100.

After that, in response to adjustment operation by the calibration operator, the calibrator 135d changes the output coefficients K supplied to the laser drive circuit 133. The laser drive circuit 133 supplies the lasers 111 with a drive signal $D_4$ based on the RGB data indicating white and the output coefficients from the calibrator 135d to cause the lasers 111 to emit light.

The calibration operator visually checks the chromaticity of the displayed color or measures the chromaticity of the displayed color using a color meter or the like, for example. Thereby, the calibration operator adjusts the output coefficients K so that the displayed color is the reference white.

Upon receiving a calibration end command from the calibration operator, the calibrator 135d stores the output coefficients K at the time in the memory 136 as the reference output coefficients KcR, KcG, and KcB.

The calibrator 135d also measures the wavelengths λa of the respective laser lights at the time through the wavelength detector 134, and stores them in the memory 136 as the reference wavelengths λrR, λrG, and λrB.

The calibrator 135d also measures the temperatures T of the respective lasers 111 at the time, and stores them in the memory 136 as the reference temperatures Tr. The reference temperature of the laser 111R is the reference temperature TrR. The reference temperature of the laser 111G is the reference temperature TrG. The reference temperature of the laser 111B is the reference temperature TrB.

Thus, the memory 136 stores the ratio KcR:KcG:KcB between the output powers PR, PG, and PB indicated by the drive signals $D_{4R}$, $D_{4G}$, and $D_{4B}$ supplied to the lasers 111R, 111G, and 111B when the wavelengths λaR, λaG, and λaB of lights from the respective lasers 111R, 111G, and 111B are the reference wavelengths λrR, λrG, and λrB and the color of light emitted from the light source unit 110 is the reference white.

When the wavelengths λaR, λaG, and λaB of lights from the respective lasers 111R, 111G, and 111B are the reference wavelengths ξrR, λrG, and λrB, the memory 136 stores the ratio KcR:KcG:KcB when the color of light emitted from the light source unit 110 is the reference white. The ratio KcR:KcG:KcB is the ratio between the output powers PR, PG, and PB. The output powers PR, PG, and PB are indicated by the drive signals $D_{4R}$, $D_{4G}$, and $D_{4B}$.

The calibrator 135d may be disposed outside the image display apparatus 100.

<Process for Determining Correction Coefficients>

A process for determining the correction coefficients will be described in detail below.

The correction value determiner 135c previously stores a color value CW (XW, YW, ZW) of a reference white in the XYZ color system. The correction value determiner 135c also determines, from color matching functions, a color value CrR (XrR, YrR, ZrR), a color value CrG (XrG, YrG, ZrG), and a color value CrB (XrB, YrB, ZrB) corresponding to the reference wavelengths λrR, λrG, and λrB.

The correction value determiner 135c determines the correction coefficients αR, αG, and αB by the following first to third calculations using the color values CaR (XaR, YaR, ZaR), CaG (XaG, YaG, ZaG), and CaB (XaB, YaB, ZaB) determined by the color value determiner 135b, the color values CrR (XrR, YrR, ZrR), CrG (XrG, YrG, ZrG), and CrB (XrB, YrB, ZrB) corresponding to the reference wavelengths λrR, λrG, and λrB, and the color value CW (XW, YW, ZW) of the reference white.

The correction value determiner 135c determines the correction coefficients αR, αG, and αB using the color values Ca, color values Cr, and color value CW. In determining the correction coefficients αR, αG, and αB, the correction value determiner 135c uses the first calculation, second calculation, and third calculation.

(First Calculation)

The correction value determiner 135c calculates a ratio KaR:KaG:KaB when the color values C of lights from the respective lasers 111 are the color values Ca determined by the color value determiner 135b and the color value Cai of light obtained by combining the lights from the respective lasers 111 is the color value CW of the reference white. The ratio KaR:KaG:KaB indicates the ratio between the powers of the lights from the lasers 111R, 111G, and 111B.

Specifically, from the color values CaR (XaR, YaR, ZaR), CaG (XaG, YaG, ZaG), and CaB (XaB, YaB, ZaB) of the respective lasers determined by the color value determiner 135b and the color value CW (XW, YW, ZW) of the reference white, the correction value determiner 135c determines output coefficients KaR, KaG, and KaB at which the color of the combined light is the reference white when IR=IG=IB.

The correction value determiner 135c determines, from the color values Ca and color value CW, output coefficients Ka at which the color value Cai is the color value CW.

More specifically, the correction value determiner 135c calculates output coefficients KaR, KaG, and KaB by solving the following linear equations (5).

$$XW = XaR \cdot KaR + XaG \cdot KaG + XaB \cdot KaB$$

$$YW = YaR \cdot KaR + YaG \cdot KaG + YaB \cdot KaB$$

$$ZW = ZaR \cdot KaR + ZaG \cdot KaG + ZaB \cdot KaB \quad (5)$$

Equations (5) are obtained by substituting the color value CW of the reference white for the color value Cai of the combined light in equations (2) and substituting the color values Ca determined by the color value determiner 135b for the color values C of the respective lasers 111 in equations (2), and omitting the grayscale values IR, IG, and IB. This is because the grayscale values IR, IC, and IB are equal when white is displayed, and it is sufficient to determine the ratio between the output coefficients KaR, KaG, and KaB.

(Second Calculation)

The correction value determiner 135c calculates a ratio KrR:KrG:KrB between the powers P of lights from the lasers 111R, 111G, and 111B when the color values C of the lights from the respective lasers 111 are the color values Cr corresponding to the reference wavelengths λr and the color value Cri of light obtained by combining the lights from the respective lasers 111 is the color value CW of the reference white.

The correction value determiner 135c calculates a ratio KrR:KrG:KrB when the color values C are the color values Cr and the color value Cri is the color value CW.

Specifically, from the color values CrR (XrR, YrR, ZrR), CrG (XrG, YrG, ZrG), and CcR (XrB, YrB, ZrB) corresponding to the reference wavelengths and the color value CW (XW, YW, ZW) of the reference white, the correction value determiner 135c determines output coefficients KrR, KrG, and KrB at which the color of the combined light is the reference white when the grayscale values IR, IG, and IB are equal (i.e., IR=IG=IB).

The correction value determiner 135c determines, from the color values Cr and color value CW, output coefficients KrR, KrG, and KrB at which the color value Cri is the color value CW when the grayscale values IR, IG, and IB are equal (i.e., IR=IG=IB).

More specifically, the correction value determiner 135c calculates output coefficients KrR, KrG, and KrB by solving the following linear equations (6).

$$XW = XrR \cdot KrB + XrG \cdot KrG + XrB \cdot KrB$$

$$YW = YrR \cdot KrR + YrG \cdot KrG + YrB \cdot KrB$$

$$ZW = ZrR \cdot KrR + ZrG \cdot KrG + ZrB \cdot KrB \quad (6)$$

Equations (6) are obtained by substituting the color value CW of the reference white for the color value Cri of the combined light in equations (2) and substituting the color values Cr of the respective laser lights corresponding to the reference wavelengths λr for the color values C of the laser lights from the respective lasers 111 in equations (2), and omitting the grayscale values IR, IG, and IB. This is because the grayscale values IR, IG, and TB are equal when white is displayed, and it is sufficient to determine the ratio between the output coefficients KrR, KrG, and KrB.

(Third Calculation)

From the output coefficients KaR, KaG, and KaB obtained by the first calculation and the output coefficients KrR, KrG, KrB obtained by the second calculation, the correction value determiner 135c determines the correction coefficients αR, αG, and αB according to the following equations (7).

$$\alpha R = KaR / KrR$$

$$\alpha G = KaG / KrG$$

$$aB = KaB / KrB$$

In this example, the reference white in the first and second calculations is a white having a color temperature of 6500 K, and the color value CW (XW, YW, ZW) of the reference white is determined by the following calculation.

The white having a color temperature of 6500 K is represented by the following u'v' chromaticity (u', v') in a uniform chromaticity scale (UCS) chromaticity diagram. For the white having a color temperature of 6500 K, the value of u' is 0.1978, and the value of v' is 0.4683. That is, the u'v' chromaticity (u', v') is (0.1978, 0.4683).

The above u'v' chromaticity (u', v') is converted into coordinates (x, y) in an xy chromaticity diagram according to the following equations (8).

$$x = 9 \times u'/(6 \times u' - 16 \times v' + 12)$$

$$y = 4 \times v'/(6 \times u' - 16 \times v' + 12) \quad (8)$$

The above conversion yields the following coordinates (x, y). The value of the x coordinate is 0.3127. The value of the y coordinate is 0.3290. That is, the coordinates (x, y) are (0.3127, 0.3290).

Next, the above coordinates (x, y) in the xy chromaticity diagram are converted into tristimulus values (XYZ values) in the XYZ color system according to the following equations (9), so that the color value (XW, YW, ZW) of the reference white in the XYZ color system is obtained.

$$X = Y \times x/y$$

$$Y = \text{arbitrary value}$$

$$Z = Y \times (1 - x - y)/y \quad (9)$$

In the above equations (9), the Y value corresponds to luminance and is an arbitrary value. However, when the color value CW of the reference white is calculated, the Y value is set to a predetermined value (e.g., "1").

When the Y value is set to "1", the above conversion yields the following color value CW (XW, YW, ZW). XW is 0.9505. YW is 1. ZW is 1.0891. That is, the color value CW (XW, YW, ZW) is (0.9505, 1, 1.0891).

In the above example, the correction value determiner 135c stores the color value CW (XW, YW, ZN) of the reference white, which has been previously calculated. However, the correction value determiner 135c calculates the color value CW (XW, YW, ZN) of the reference white each time it required. Thus, the color value CW need not necessarily be a value calculated in advance. The color value CW may be a value calculated when required.

Further, in the above example, the output coefficients KrR, KrG, and KrB are calculated by the second calculation each time they are required. However, the correction value determiner 135c may store the output coefficients KrR, KrG, and KrB, which have been previously calculated by the second calculation. Thus, the output coefficients Kr need not necessarily be values calculated when required.

Further, as described in the above example, it is desirable that the same reference white be used in both the color calibration and the determination of the correction coefficients. However, different reference whites may be used.

<Operational Procedure Regarding Image Display>

Figure 9:
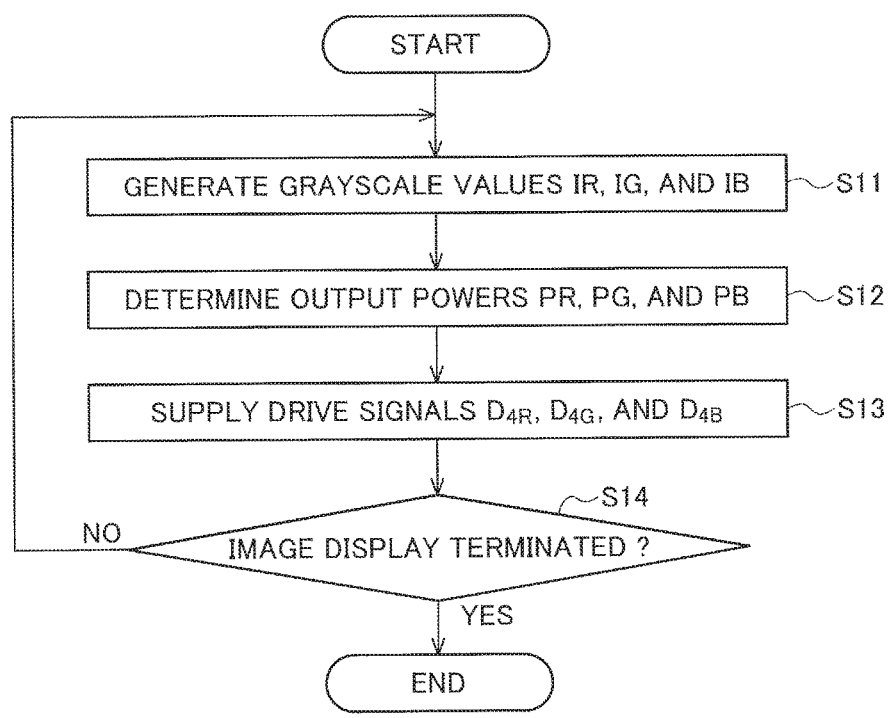
FIG. 9 is a flowchart illustrating an image display process in the first embodiment.

FIG. 9 is a flowchart illustrating an image display process. An operational procedure regarding image display by the light source controller 130 will be described below with reference to the flowchart of FIG. 9.

When the light source controller 130 determines that display of an image by the image display apparatus 100 is to be started, it starts the process of FIG. 9.

In step S11, the light source controller 130 generates, based on image signal data of an image to be displayed, grayscale values IR, IG, and IB of a pixel to be displayed.

Then, in step S12, the light source controller 130 determines output powers PR, PG, and PB of the respective lasers 111 according to equations (1) from the grayscale values IR, IG, and IB determined in step S11 and the output coefficients KR, KG, and KB stored in the output coefficient memory 133a.

Then, in step S13, the light source controller 130 supplies drive signals $D_{4R}$, $D_{4G}$, and $D_{4B}$ indicating the output powers PR, PG, PB determined in step S12, to the lasers 111R, 111G, and 111B, respectively. Thereby, the lasers 111R, 111G, and 111B emit laser lights having powers corresponding to the supplied drive signals $D_{4R}$, $D_{4G}$, and $D_{4B}$.

Then, in step S14, the light source controller 130 determines whether the display of the image by the image display apparatus 100 is to be terminated.

When it is determined that the display of the image is not to be terminated (NO in S14), the process returns to step S11 and the same process is performed for the next pixel. On the other hand, when it is determined that the display of the image is to be terminated (YES in S14), the process regarding image display by the light source controller 130 illustrated in FIG. 9 is terminated.

In FIG. 9, steps S11 and S14 are performed by the image data converter 131. Steps S12 and S13 are performed by the laser drive circuit 133.

<Operational Procedure Regarding Color Correction>

Figure 10:
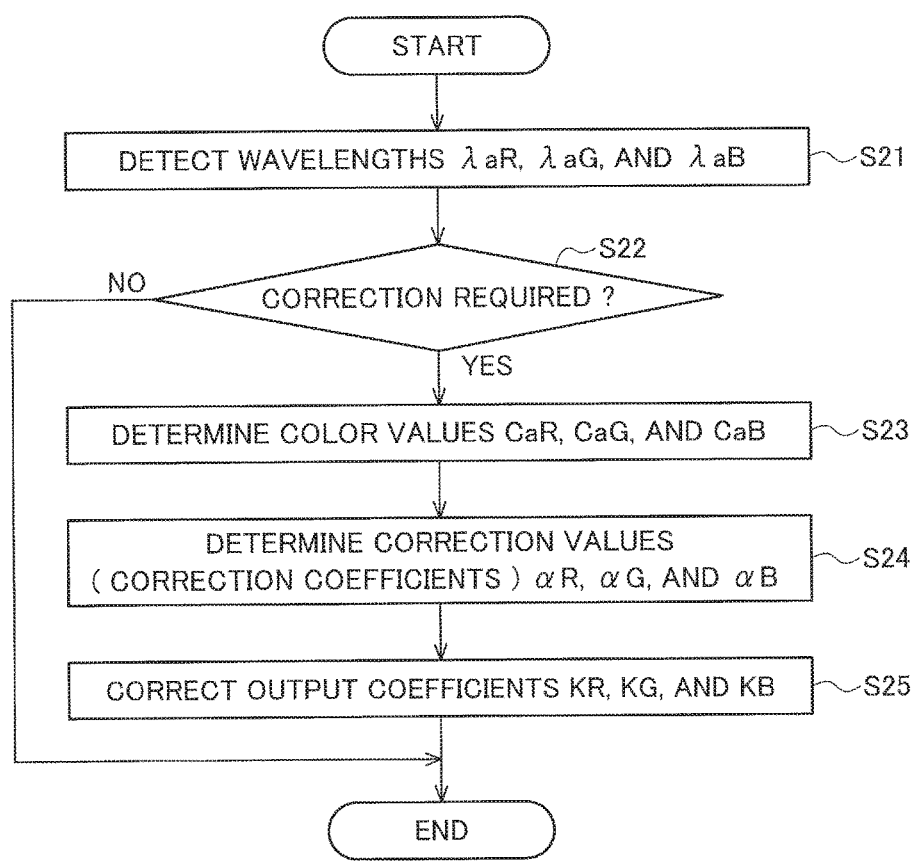
FIG. 10 is a flowchart illustrating a color correction process in the first embodiment.

FIG. 10 is a flowchart illustrating a color correction process. An operational procedure (or display correction method) regarding color correction by the light source controller 130 will be described below with reference to the flowchart of FIG. 10.

The process of FIG. 10 is performed at a predetermined time. For example, the process of FIG. 10 is performed at the time of starting the image display. After that, the process of FIG. 10 is performed periodically at predetermined time intervals.

When a color correction control is enabled and the process of FIG. 10 is started, the light source controller 130 detects the wavelengths λaR, λaG, and λaB of the lasers 111R, 111G, and 111B in step S21. Here, the light source controller 130 detects the wavelengths λaR, λaG, and λaB sequentially, one at a time, at predetermined time intervals for example.

Then, in step S22, the light source controller 130 determines, based on the wavelengths λa detected in step S21, whether the color correction is required.

For example, the light source controller 130 determines, for the red laser 111R, the absolute value |λaR−λrR| of the difference between the wavelength λaR detected in step S21 and the reference wavelength λrR stored in the memory 136.

For example, when the absolute value |λaR−λrR| is greater than a threshold value, the light source controller 130 determines that the color correction is required. That is, when the absolute value |λaR−λrR| is greater than a threshold value, the light source controller 130 determines that the color correction is required.

Otherwise, the light source controller 130 determines that the color correction is not required. That is, when the absolute value |λaR−λrR| is less than or equal to the threshold value, the light source controller 130 determines that the color correction is not required.

In another aspect, for example, the light source controller 130 determines, for each of the red, green, and blue lasers 111, the absolute value of the difference between the detected wavelength λa and the reference wavelength λr.

Then, for example, when for at least me (or each) of the colors, the determined absolute value of the difference is greater than a threshold value, the light source controller 130 determines that the color correction is required.

Otherwise, the light source controller 130 determines that the color correction is not required. That is, when each (or at least one) of the determined absolute values of the differences is less than or equal to the threshold value, the light source controller 130 determines that the color correction is not required.

These threshold values may be previously determined.

When the light source controller 130 determines that the color correction is not required (NO in S22), it terminates the process. When the light source controller 130 determines that the color correction is required (YES in S22), it advances the process to step S23.

In step S23, the light source controller 130 determines, from color matching functions, the color values CaR (XaR, YaR, ZaR), CaG (XaG, YaG, ZaG), and CaB (XaB, YaB, ZaB) respectively corresponding to the wavelengths λaR, λaG, and λaB detected in step S21. That is, the light source controller 130 calculates the color values Ca from the wavelengths λa.

Then, in step S24, the light source controller 130 determines the correction coefficients αR, αG, and αB.

Specifically, the light source controller 130 calculates the output coefficients KaR, KaG, and KaB by the first calculation from the color values CaR (XaR, YaR, ZaR), CaG (XaG, YaG, ZaG), and CaB (XaB, YaB, ZaB) determined in step S23 and the color value CW (XW, YW, ZW) of the reference white. The color value CW (XW, YW, ZW) of the reference white may be previously stored.

That is, the light source controller 130 calculates the output coefficients Ka from the color values Ca and color value CW. The first calculation is used to calculate the output coefficients Ka.

Then, the correction coefficients αR, αG, and αB are calculated by the third calculation from the calculated output coefficients KaR, KaG, and KaB, and the output coefficients KrR, KrG, and KrB previously determined by the second calculation.

That is, the light source controller 130 calculates the correction coefficients α from the output coefficients Ka and output coefficients Kr. The third calculation is used to calculate the correction coefficients α. The second calculation is used to calculate the output coefficients Kr.

Then, in step S25, the light source controller 130 multiplies the reference output coefficients KcR, KcG, and KcB that have been previously determined in the color calibration and stored in the memory 136, by the correction coefficients αR, αG, and αB determined in step S24, and stores the resultant values in the output coefficient memory 133a as the output coefficients KR, KG, and KB.

That is, the light source controller 130 multiplies the reference output coefficients Kc by the correction coefficients α to determine the output coefficients K. Then, the light source controller 130 stores the output coefficients K in the output coefficient memory 133a. The reference output coefficients Kc are stored in the memory 136.

In FIG. 10, step S21 is performed by the wavelength detector 134. Step S22 is performed by the correction necessity determiner 135a. Step S23 is performed by the color value determiner 135b. Step S24 is performed by the correction value determiner 135c. Step S25 is performed by the laser drive circuit 133.

In step S22, it is also possible to determine whether the correction is required, using the temperatures T of the lasers 111, instead of the wavelengths λa of the lasers 111.

For example, in step S22, the light source controller 130 measures the temperature TR of the laser 111R.

Then, the light source controller 130 determines the absolute value of the difference between the measured temperature TR of the laser 111R and the reference temperature TrR of the laser 111R stored in the memory 136. When the absolute value of the difference is greater than a threshold value, the light source controller 130 determines that the correction is required. That is, when the absolute value |TR−TrR| is greater than a threshold Value, the light source controller 130 determines that the color correction is required.

Otherwise, the light source controller 130 determines that the correction is not required. That is, when the absolute value |TR−TrR| is less than or equal to the threshold value, the light source controller 130 determines that the color correction is not required.

In another aspect, for example, the light source controller 130 measures the temperatures TR, TG, and TB of the respective lasers 111R, 111G, and 111B. Then, the light source controller 130 determines, for each of the lasers 111R, 111G, and 111B, the absolute value of the difference between the measured temperature TR, TG, or TB and the reference temperature TrR, TrG, or TrB.

Then, for example, when for at least one (or each) of the lasers 111, the determined absolute value of the difference is greater than a threshold value, the light source controller 130 determines that the correction is required.

Otherwise, the light source controller 130 determines that the correction is not required. That is, when each or (at least one) of the determined absolute values of the differences is less than or equal to the threshold value, the light source controller 130 determines that the color correction is not required.

These threshold values may be previously determined.

When whether the correction is required is determined based on the temperatures T of the lasers, the light source controller 130 may make the determination in step S22 as to whether the correction is required, before the detection of the wavelengths λa in step S21. Then, when it is determined in step S22 that the correction is required, the detection of the wavelengths λa in step S21 may be performed. This allows the detection of the wavelengths λa to be performed only when it is required.

<Explanation Using Chromaticity Diagram>

The color displayed by the image display apparatus 100 of the first embodiment will be described below using chromaticity diagrams.

Figure 11:
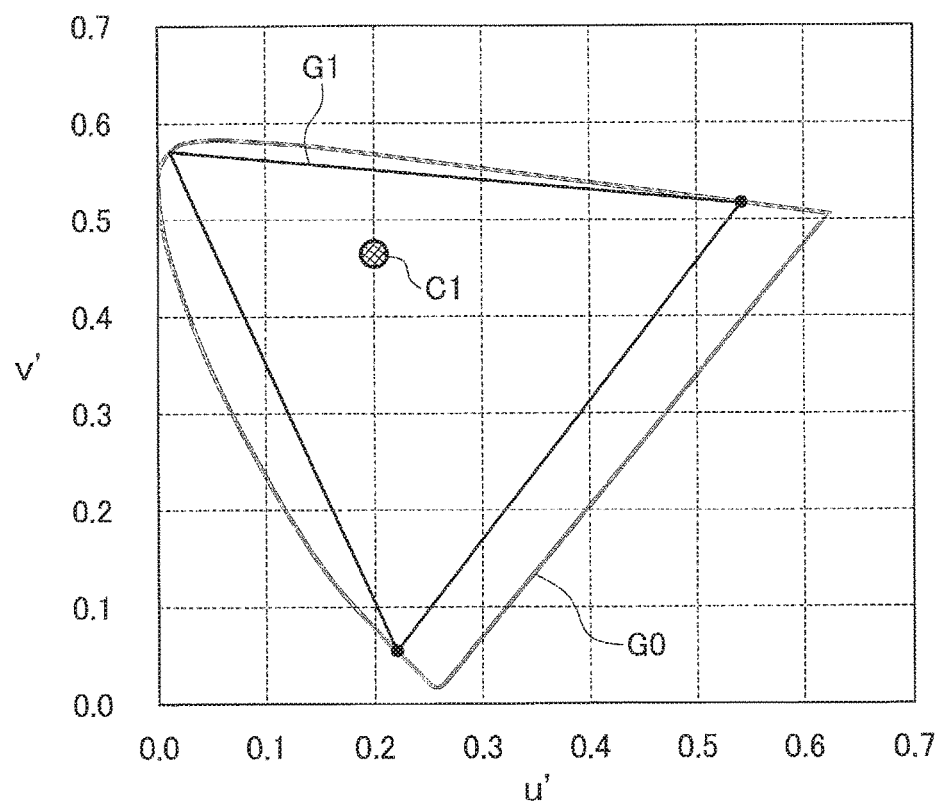
FIG. 11 is a chromaticity diagram showing a color gamut and the chromaticity of white of the image display apparatus at a reference temperature.
Figure 12:
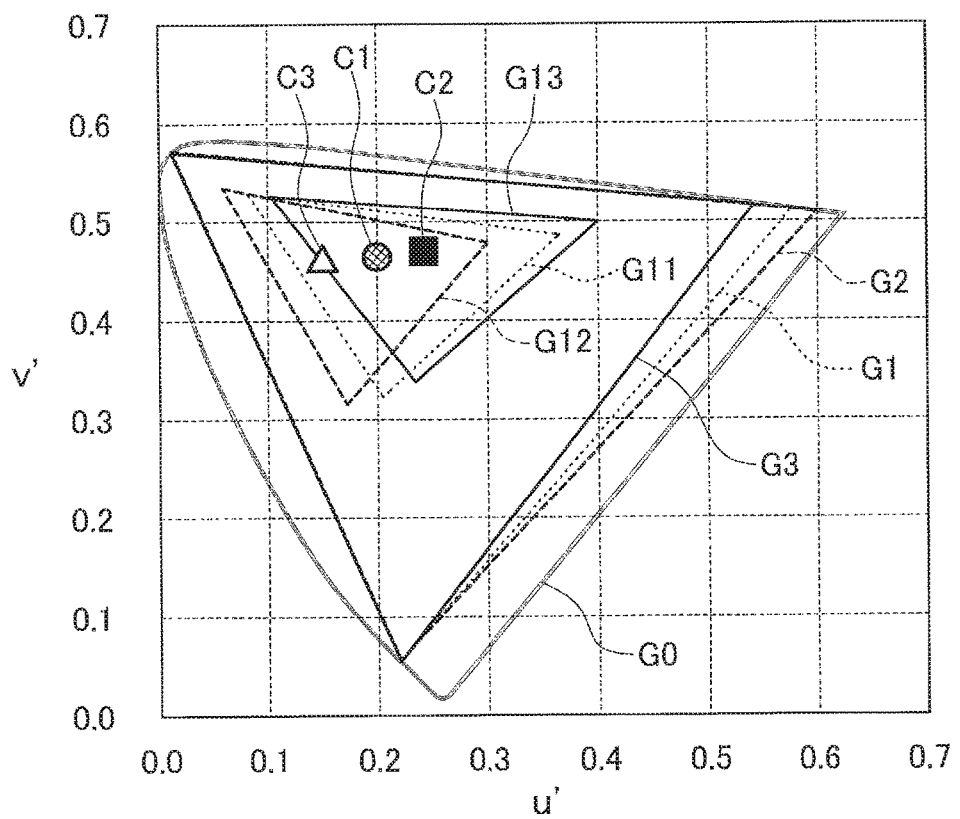
FIG. 12 is a chromaticity diagram showing effects of temperature variation on the color gamut and chromaticity of white of the image display apparatus when no color correction is performed.
Figure 13:
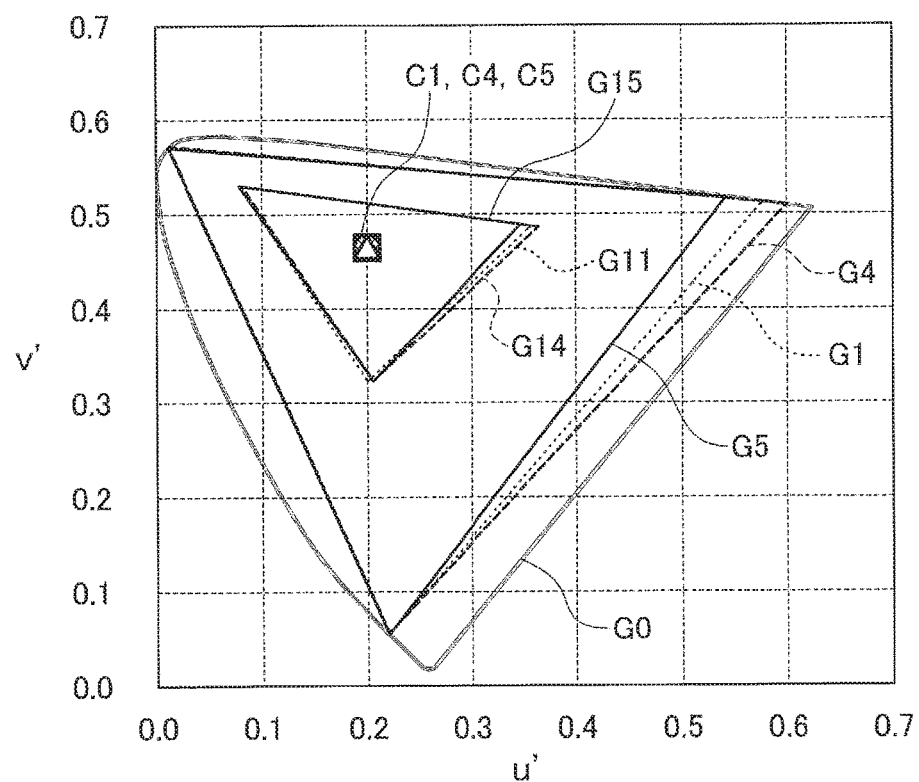
FIG. 13 is a chromaticity diagram showing effects of temperature variation on the color gamut and chromaticity of white of the image display apparatus when color correction is performed.

FIGS. 11, 12, and 13 each illustrate a UCS chromaticity diagram.

The UCS chromaticity diagram is a chromaticity diagram in which the distance between two points on the chromaticity diagram is substantially proportional to the perceived color difference. In the UCS chromaticity diagram, the upper left side corresponds to green, a bottom center portion corresponds to blue, and the upper right side corresponds to red. A portion between these colors corresponds to mixed colors. For example, a portion between the upper left (green) and the upper right (red) corresponds to yellow. The horizontal axis is the u' axis. The vertical axis is the v' axis.

FIGS. 11, 12, and 13 each show, on the UCS chromaticity diagram, the visible gamut (the region enclosed by the gray solid line) G0 that is a range of colors perceivable to human beings. The boundary (the gray solid line) of the visible gamut G0 is a chromaticity locus of single-wavelength light.

FIG. 11 shows, on the UCS chromaticity diagram, the gamut (the triangular region enclosed by the black solid line) G1 of colors that can be displayed by the image display apparatus 100, and the chromaticity (the circle mark) C1 of white displayed by the image display apparatus 100. The color gamut G1 and chromaticity C1 are those at the reference temperatures Tr.

The color gamut G1 was calculated under the following conditions (a) to (c).

(a) At the reference temperatures TrR, TrG, and TrB, the wavelengths $\lambda aR$, $\lambda aG$, and $\lambda aB$ of the lasers 111R, 111G, and 111B are 638 nm, 515 nm, and 450 nm, respectively. That the wavelength $\lambda aR$ is 638 nm. The wavelength $\lambda aG$ is 515 nm. The wavelength $\lambda aB$ is 450 nm.

(b) The reference white is a white having a color temperature of 6500 K. The chromaticity C1 (u', v') of the reference white is (0.1978, 0.4683).

(c) The image display apparatus 100 is calibrated so that at the reference temperatures TrR TrG, and TrB, the displayed color of RGB data (IR=IC=IB=255) indicating white is the reference white.

The chromaticity C1 coincides with the chromaticity of the reference white.

FIG. 12 shows, on the UCS chromaticity diagram, the gamut (the triangular region enclosed by the outer dotted line) G1 of colors that can be displayed by the image display apparatus 100, a color gamut (the triangular region enclosed by the outer dashed line) G2, and a color gamut (the triangular region enclosed by the outer solid line) G3. Further, FIG. 12 shows, on the UCS chromaticity diagram, chromaticities C1 (the circle mark), C2 (the square mark), and C3 (the triangle mark) of white in the respective color gamuts G1, G2, and G3 of the image display apparatus 100.

Further, FIG. 12 shows a color gamut (the triangular region enclosed by the inner dotted line) G11, a color gamut (the triangular region enclosed by the inner dashed line) G12, and a color gamut (the triangular region enclosed by the inner solid line) G13 when a color ratio of RGB data is 4:1:1.

The color gamuts G1 and G11 and chromaticity C1 are those when the temperatures TR, TG, and TB of the lasers 111 are the reference temperatures TrR, TrG, and TrB. The color gamuts G2 and G12 and chromaticity C2 are those when the temperatures TR, TG, and TB of the lasers 111 are 60 degrees above the reference temperatures TrR, TrG, and TrB. The color gamuts G3 and G13 and chromaticity C3 are those when the temperatures TR, TG, and TB of the lasers 111 are 60 degrees below the reference temperatures TrR, TrG, and TrB.

The color gamuts when the color ratio of RGB data is 4:1:1 are obtained by connecting the following three chromaticities (three points on the chromaticity diagram).

The first chromaticity is the chromaticity of the displayed color when the grayscale values IR, IG, and TB satisfy IR:IG:IB=4:1:1. The second chromaticity is the chromaticity of the displayed color when the grayscale values IR, IG, and IB satisfy IR:IG:IB=1:4:1. The third chromaticity is the chromaticity of the displayed color when the grayscale values IR, IG, and IB satisfy IR:IG:IB=1:1:4.

The color gamuts and chromaticities in FIG. 12 were calculated under the above conditions (a) to (c) and the following conditions (d) and (e).

(d) The temperature dependencies of the wavelengths $\lambda aR$, $\lambda aG$, and $\lambda aB$ of the lasers 111R, 111G, and 111B are 0.2 nm/deg, 0.02 nm/deg, and 0.02 nm/deg, respectively. That the temperature dependency of the wavelength $\lambda aR$ is 0.2 nm/deg. The temperature dependency of the wavelength $\lambda aG$ is 0.02 nm/deg. The temperature dependency of the wavelength $\lambda aB$ is 0.02 nm/deg.

(e) The image display apparatus 100 performs no color correction by the color corrector 135.

FIG. 12 shows variation in the displayed color when the temperatures TR, TG, and TB vary by ±60 degrees from the reference temperatures TrR, TrG, and TrB while no color correction is performed by the color corrector 135.

FIG. 12 shows that when the wavelengths $\lambda a$ of the lasers 111 vary with variations in the temperatures TR, TG, and TB, if no color correction is performed by the color corrector 135, colors different from colors to be displayed are displayed.

A closer look at FIG. 12 shows that the gamut of colors that can be displayed by the image display apparatus 100 is greatly affected by variation in the wavelength $\lambda aR$ of the red laser 111R. Due to variation in the temperature TR, the color gamut greatly varies in a red region. An upper right region of the UCS chromaticity diagram corresponds to red.

On the other hand, in a green region and a blue region, the color gamut varies little. An upper left region of the UCS chromaticity diagram corresponds to green. A bottom center region of the UCS chromaticity diagram corresponds to blue.

Further, the chromaticity of white shifts mainly in the u' direction depending on the temperatures. Likewise, the color gamut when the color ratio of RGB data is 4:1:1 shifts greatly in the u' direction.

FIG. 13 shows, on the UCS chromaticity diagram, the gamut (the triangular region enclosed by the outer dotted line) G1 of colors that can be displayed by the image display apparatus 100, a color gamut (the triangular region enclosed by the outer dashed line) G4, and a color gamut (the triangular region enclosed by the outer solid line) 05. Further, FIG. 13 shows, on the UCS chromaticity diagram, chromaticities C1 (the circle mark), C4 (the square mark), and C5 (the triangle mark) of white in the respective color gamuts G1, G4, and G5 of the image display apparatus 100.

Further, FIG. 13 shows the color gamut (the triangular region enclosed by the inner dotted line) G11, a color gamut (the triangular region enclosed by the inner dashed line) G14, and a color gamut (the triangular region enclosed by the inner solid line) G15 when the color ratio of RGB data is 4:1:1.

The color gamuts G1 and G11 and chromaticity C1 are those when the temperatures TR, TG, and TB of the lasers 111 are the reference temperatures TrR, TrG, and TrB. The color gamuts G4 and G14 and chromaticity C4 are those when the temperatures TR, TG, and TB of the lasers 111 are 60 degrees above the reference temperatures TrR, TrG, and TrB. The color gamuts G5 and G15 and chromaticity C5 are those when the temperatures TR, TG, and TB of the lasers 111 are 60 degrees below the reference temperatures TrR, TrG, and TrB.

The color gamuts and chromaticities in FIG. 13 were calculated under the above conditions (a) to (d) and the following condition (f).

(f) The image display apparatus 100 performs the color correction by the color corrector 135.

FIG. 13 shows variation in the displayed color when the temperatures TR, TG, and TB vary by ±60 degrees from the reference temperatures TrR, TrG, and TrB while the color correction is performed by the color corrector 135.

FIG. 13 shows that when the color correction by the color corrector 135 is performed, the chromaticities C1, C4, and C5 of white and the color gamuts G11, G14, and G15 when the color ratio of RGB data is 4:1:1 vary little with variations in the temperatures TR, TG, and TB.

As such, even when the temperature environment of the image display apparatus 100 greatly varies and the wavelengths λa of the lasers 111 shift, by performing the color correction, it is possible to display an image with less color variation.

<Advantages>

The above-described first embodiment provides the following advantages (1) to (7).

(1) The image display apparatus 100 detects information indicating the wavelengths λa of the respective lasers 111. The image display apparatus 100 then corrects, based on the detected information indicating the wavelengths λa of the respective lasers 111, the ratio between the powers P of laser lights emitted from the respective lasers 111. Thereby, it is possible to correct the displayed color in response to variations in the wavelengths λa of laser lights from the respective lasers 111.

As a result, when the wavelengths λa of the lasers 111 vary, it is possible to reduce variation in color of a displayed image. The image display apparatus 100 can display an image with less color variation. It is possible to reduce variation in color of a displayed image due to variations in the wavelengths λa of lights emitted from the lasers 111.

(2) Like the technique described in Patent Literature 1, a configuration in which Peltier elements are used to maintain the temperatures of lasers at predetermined temperatures has the following problems.

A Peltier element is small and has the feature of generating neither noise nor vibration.

However, a Peltier element radiates a large amount of heat, so it has poor power efficiency in cooling and consumes a large amount of power.

Further, since heat corresponding to the consumed power is generated on a heat radiation side, the Peltier element itself needs to be cooled sufficiently, which enlarges the apparatus. In particular, an in-vehicle image display apparatus is used over a wide range of temperature (e.g., −40 to 85° C.). Thus, it is difficult to regulate the temperatures of the lasers at predetermined temperatures by means of Peltier elements. The predetermined temperatures are, for example, from 15 to 25° C.

Further, it takes time before the lasers reach the desired temperatures after the temperature regulation starts. Thus, in an environment, such as an in-vehicle environment, in which temperature varies over a wide range, it is difficult to regulate the temperatures of the lasers at predetermined temperatures, and reduce variation in color of a displayed image. The desired temperatures are, for example, predetermined temperatures that are target values of the temperature regulation.

On the other hand, according to the first embodiment, when the wavelengths λa of the lasers 111 vary, it is possible to correct the output powers P of the lasers 111, thereby correcting the displayed color. Thus, there is no need to perform temperature regulation to maintain the wavelengths λa of the lasers 111 within predetermined ranges. Here, the predetermined ranges are a target range of variation in color of a displayed image.

In the first embodiment, no temperature control elements, such as Peltier elements, for heating or cooling the lasers 111 are required. Thus, compared to the case of using temperature control elements, it is possible to eliminate power consumption by the temperature control elements. This can reduce power consumption by the image display apparatus 100. Further, heat dissipation measures required for the temperature control elements can be omitted. This allows the image display apparatus 100 to be downsized.

For semiconductor lasers, operating under high temperature or extremely low temperature can affect the lifetime. Thus, for example, temperature control elements, such as Peltier elements, may be used to regulate the ambient temperatures around the semiconductor lasers within a range of 0 to 60° C. Even in such a case, since the ambient temperatures around the semiconductor lasers are regulated, it is possible to reduce power consumption as compared to the case of keeping the temperatures of the semiconductor lasers constant.

Further, according to the first embodiment, the displayed color can be corrected by correcting the output powers P of the lasers 111 in response to variations in the wavelengths λa of the lasers 111. Thus, by setting the time interval at which the color correction is performed (or the time interval at which determination as to whether the color correction is to be performed is made) to be small, it is possible to appropriately correct the displayed color even when the wavelengths λa of the lasers 111 change rapidly due to a rapid change in temperature.

(3) The image display apparatus 100 determines, from the detected information indicating the wavelengths λa of the respective lasers 111, the color values Ca of the respective lasers 111 in a predetermined color space. Then, it determines the correction value $D_g$ based on the color values Ca of the respective lasers 111. This makes it possible to easily calculate the correction value $D_g$ by calculation on the color space.

(4) The image display apparatus 100 determines whether the color correction is required, and when it is determined that the color correction is required, performs the process to determine the color values Ca, performs the process to determine the correction value $D_g$, and performs the process to correct the ratio between the powers PR, PG, and PB of lights from the respective lasers 111. This makes it possible to prevent unnecessary processes from being performed, and reduce the processing load on the image display apparatus 100.

(5) The image display apparatus 100 uses tristimulus values in an XYZ color system as the color values Ca for performing the color correction. This makes it possible to accurately determine variations in the colors of the laser lights due to variations in the wavelengths λa of the lasers 111, and accurately perform the color correction.

(6) The image display apparatus 100 multiplies the reference output coefficients Kc by the correction coefficients αR, αG, and αB, thereby correcting the ratio between the powers PR, PG, and PB of lights from the respective lasers 111. This eliminates the need for providing special means for driving and controlling the lasers, and makes it possible to easily set the outputs of the lasers 111.

(7) The image display apparatus 100 determines the correction value (correction coefficients αR, αG, and αB) when the wavelengths λa have changed, from the relationship between the output coefficients K of the respective lasers 111 at the current wavelengths (wavelengths after the change) λa and the output coefficients Kr of the respective lasers 111 at the reference wavelengths λr. This makes it possible to appropriately determine the correction value in response to change in the wavelengths λa.

Hereinafter, image display apparatuses 100 according to first to third modifications will be described. The image display apparatuses 100 according to the first to third modifications differ from the above image display apparatus 100 in the process by the light source controller 130, but otherwise are the same. In descriptions of the first to third modifications, elements that are the same as or corresponding to those of the above image display apparatus 100 will be given the same reference characters, and descriptions thereof will be omitted or simplified.

For convenience, in the following description, the above-described content will be referred to as the first embodiment.

<First Modification>

First modification determines, in the color calibration, a calculated color value CWc (XWc, YWc, ZWc) of the combined light when the color of the combined light is actually a reference white. Then, when displaying an image, the first modification determines the output coefficients KR, KG, and KB so that the calculated color value CWc (XWc, YWc, ZWc) is maintained.

That is, the image display apparatus 100 of the first modification calculates a color value CWc when the color of the combined light is a reference white. The image display apparatus 100 then determines the output coefficients KR, KG, and KB so that the color value CWc is maintained.

First, the color calibration in the first modification will be described.

The calibrator 135d determines the reference output coefficients KcR, KcG, and KcB and the reference wavelengths $\lambda$rR, $\lambda$rG, and $\lambda$rB, as in the first embodiment.

The calibrator 135d determines, from color matching functions, the color values CrR (XrR, YrR, ZrR), CrG (XrG, YrG, ZrG), and CrB (XrB, YrB, ZrB) corresponding to the reference wavelengths $\lambda$rR, $\lambda$rG, and $\lambda$rB.

The calibrator 135d determines the color value CWc (XWc, YWc, ZWc) of the combined light in the calibration, according to the following equations (10), from, the color values CrR (XrR, YrR, ZrR), CrG (XrG, YrG, ZrG), and CrB (XrB, YrB, ZrB) corresponding to the reference wavelengths $\lambda$rR, $\lambda$rG, and $\lambda$rB, and the reference output coefficients KcR, KcG, and KcB.

$$XWc=XrR\cdot KcR+XrG\cdot KcG+XrB\cdot KcB$$

$$YWc=YrR\cdot KcR+YrG\cdot KcG+YrB\cdot KcB$$

$$ZWc=ZrR\cdot KcR+ZrG\cdot KcG+ZrB\cdot KcB \qquad (10)$$

This color value CWc (XWc, YWc, ZWc) is a calculated color value of the combined light when the color of the combined light is actually the reference white. The calibrator 135d stores the determined CWc (XWc, YWc, ZWc) in the memory 136 as the color value of the reference white.

In the first modification, the memory 136 need not store the reference output coefficients KcR, KcG, and KcB, and the reference wavelengths $\lambda$rR, $\lambda$rG, and $\lambda$rB.

Next, determination of the correction value $D_8$ and determination of the output powers P in the first embodiment will be described.

The color value determiner 135b determines, from detected information indicating the wavelengths $\lambda$a, the color values CaR (XaR, YaR, ZaR), CaG (XaG, YaG, ZaG), and CaB (XaB, YaB, ZaB) of the respective laser lights, as in the first embodiment.

The correction value determiner 135c calculates the ratio KR:KG:KB between the powers PR, PG, and PB of lights from the lasers 111R, 111G, and 111B when the color values C of lights from the respective lasers 111 are the color values Ca determined by the color value determiner 135b and the color value Ci of light obtained by combining the lights from the respective lasers 111 is the color value CWc (XWc, YWc, ZWc) of the reference white.

That is, the correction value determiner 135c determines the ratio between the powers PR, PG, and PB of the lights when the color values C of the lights from the respective lasers 111 are the color values Ca and the color value Ci is the color value CWc. The ratio between the powers PR, PG, and PB of the lights is the ratio between the output coefficients KR, KG, and KB.

Specifically, from the color values CaR (XaR, YaR, ZaR), CaG (XaG, YaG, ZaG), and CaB (XaB, YaB, ZaB) of the respective lasers determined by the color value determiner 135b and the color value CWc (XWc, YWc, ZWc) of the reference white stored in the memory 136, the correction value determiner 135c determines output coefficients KR, KG, and KB at which the color of the combined light is the reference white when IR=IG=IB.

The correction value determiner 135c determines, from the color values Ca and color value CWc, output coefficients KR, KG, and KB at which the color of the combined light is the reference white when the grayscale values IR, IG, and IB satisfy IR=IG=IB.

More specifically, the correction value determiner 135c calculates output coefficients KR, KG, and KB by solving the following linear equations (11).

$$XWc=XaR\cdot KR+XaG\cdot KG+XaB\cdot KB$$

$$YWc=YaR\cdot KR+YaG\cdot KG+YaB\cdot KB$$

$$ZWc=ZaR\cdot KR+ZaG\cdot KG+ZaB\cdot KB \qquad (11)$$

The correction value determiner 135c sends the determined output coefficients KR, KG, and KB to the laser drive circuit 133 as the correction value $D_8$.

When the laser drive circuit 133 receives the output coefficients KR, KG, and KB (correction value $D_8$) from the correction value determiner 135c, it stores them in the output coefficient memory 133a. Then, when an image is displayed, the laser drive circuit 133 receives, for each pixel of an image to be displayed, the grayscale values IR, IG, and IB (control signal $D_2$) from the image data converter 131. The laser drive circuit 133 then multiplies the grayscale values IR, IG, and IB by the output coefficients KR, KG, and KB stored in the output coefficient memory 133a to determine the output powers PR, PG, and PB of the lasers 111R, 111G, and 111B, as in the following equations (12).

$$PR=KR\cdot IR$$

$$PG=KG\cdot IG$$

$$PB=KB\cdot IB \qquad (12)$$

<Second Modification>

The above first embodiment and first modification perform the color calibration. This is because, due to errors in detection of the wavelengths $\lambda$a, errors in control of the powers P of the respective lasers 111, or the like, the output coefficients Kc when the color of the combined light is actually the reference white is different from calculated output coefficients Kr when the color of the combined light is the reference white.

However, when the output coefficients Kc when the color of the combined light is actually the reference white is sufficiently close to the calculated output coefficients Kr when the color of the combined light is the reference white, the color calibration may be omitted.

The second modification determines output coefficients KR, KG, and KB to maintain a predetermined color value CW (XW, YW, ZW) of a reference white, without performing the color calibration. In the second modification, the calibrator 135*d* may be omitted.

In the second modification, the color value determiner 135*b* determines, from detected information indicating the wavelengths λa, the color values CaR (XaR, YaR, ZaR), CaG (XaG, YaG, ZaG), and CaB (XaB, YaB, ZaB) of the respective laser lights, as in the first embodiment. That is, the color value determiner 135*b* determines the color values Ca from detected information indicating the wavelengths λa.

The correction value determiner 135*c* calculates the ratio KR:KG:KB between the powers P of lights from the lasers 111R, 111G, and 111B when the color values C of lights from the respective lasers 111 are the color values Ca determined by the color value determiner 135*b* and the color value Ci of light obtained by combining the lights from the respective lasers 111 is the color value CW (XW, YW, ZW) of the reference white. Here, the color value CW (XW, YW, ZW) of the reference white is previously stored in the correction value, determiner 135*c*.

That is, the correction value determiner 135*c* determines the ratio between the powers PR, PG, PB when the color values C are the color values Ca and the color value Ci is the color value CW.

Specifically, from the color values CaR (XaR, YaR, ZaR), CaG (XaG, YaG, ZaG), and CaB (XaB, YaB, ZaB) of the respective lasers determined by the color value determiner 135*b*, and the color value CW (XW, YW, ZW) of the reference white, the correction value determiner 135*c* determines the output coefficients KR, KG, and KB at which the color of the combined light is the reference white when the grayscale values IR, IG, and IB satisfy IR=IG=IB.

That is, from the color values Ca and color value Cw, the correction value determiner 135*c* determines the output coefficients KR, KG, and KB at which the color of the combined light is the reference white when the grayscale values IR, IG, and IB satisfy IR=IG=IB.

More specifically, the correction value determiner 135*c* calculates the output coefficients KR, KG, and KB by solving the following linear equations (13).

$$XW = XaR \cdot KR + XaG \cdot KG + ZaB \cdot KB$$

$$YW = YaR \cdot KR + YaG \cdot KG + YaB \cdot KB$$

$$ZW = ZaR \cdot KR + ZaG \cdot KG + ZaB \cdot KB \quad (13)$$

The correction value determiner 135*c* sends the determined output coefficients KR, KG, and KB to the laser drive circuit 133 as the correction value $D_g$.

When the laser drive circuit 133 receives the output coefficients KR, KG, and KB from the correction value determiner 135*c*, it stores them in the output coefficient memory 133*a*. Then, when an image is displayed, the laser drive circuit 133 receives, for each pixel of an image to be displayed, the grayscale values IR, IG, and IB from the image data converter 131. The laser drive circuit 133 then multiplies the grayscale values IR, IG, and IB by the output coefficients KR, KG, and KB stored in the output coefficient memory 133*a* to determine the output powers PR, PG, and PB of the lasers 111R, 111G, and 111B, as in the following equations (14).

$$PR = KR \cdot IR$$

$$PG = KG \cdot IG$$

$$PG = KB \cdot IB \quad (14)$$

<Third Modification>

A third modification adjusts the magnitudes of output coefficients KR, KG, and KB so that the output powers P of the respective lasers 111 do not exceed predetermined upper limits of the output powers.

In the third modification, limit output powers PuR, PuG, and PuB that are upper limits of the output powers PR, PG, and PB are set for the lasers 111R, 111G, and 111B, respectively. The limit output powers PuR, PuG, and Pub is, for example, stored in the light source controller 130. The limit output powers PuR, PuG, and PuB may be referred to collectively as the limit output powers Pu, and an arbitrary one of the limit output powers may be referred to as a limit output power Pu.

The light source controller 130 determines, based on a maximum value Imax (here 255) of the grayscale values IR, IG, and IB, and the limit output powers PuR, PuG, and Pub, a coefficient β that satisfies all of the three conditions expressed by the following equations (15).

$$\beta \cdot \alpha R \cdot KcR \cdot I\max \leq PuR$$

$$\beta \cdot \alpha G \cdot KcG \cdot I\max \leq PuG$$

$$\beta \cdot \alpha B \cdot KcB \cdot I\max \leq PuB \quad (15)$$

Further, the light source controller 130 determines, for each pixel, β·αR·KcR·IR, β·αG·KcG·IG, and β·αB·KcB·IB as target intensities of the lasers 111R, 111G, and 111B.

Specifically, in step S25 of FIG. 10, the light source controller 130 determines the output coefficients KR, KG, and KB as follows.

The light source controller 130 determines maximum output powers PmR, PmG, and PmB of the lasers 111R, 111G, and 111B, according to the following equations (16), from the correction coefficients αR, αG, and αB determined in step S24, the reference output coefficients KcR, KcG, and KcB stored in the memory 136, and the maximum value Imax. The maximum output powers PmR, PmG, and PmB may be referred to collectively as the maximum output powers Pm, and an arbitrary one of the maximum output powers may be referred to as a maximum output power Pm.

$$PmR = \alpha R \cdot KcR \cdot I\max$$

$$PmG = \alpha G \cdot KcR \cdot I\max$$

$$PmB = \alpha B \cdot KcR \cdot I\max \quad (16)$$

That is, the maximum output powers Pm are determined using the correction coefficients α, reference output coefficients Kc, and maximum value Imax. For example, the maximum output powers Pm are determined as products of the correction coefficients α, reference output coefficients Kc, and maximum value Imax.

Then, the light source controller 130 compares the maximum output powers PmR, PmG, and PmB with the limit output powers PuR, PuG, and PuB. When for at least one of the lasers 111, the maximum output power Pm is greater than the limit output power Pu, the light source controller 130 determines a coefficient β (0<β<1) that satisfies all of the following equations (17).

$$\beta \cdot PmR \leq PuR$$

$$\beta \cdot PmG \leq PuG$$

$$\beta \cdot PmB \leq PuB \quad (17)$$

For example, the light source controller 130 determines PuR/PmR, PuG/PmG, and PuB/PmB. The light source controller 130 then determines the smallest of them as the coefficient β.

The light source controller 130 then multiplies the reference output coefficients KcR, KcG, and KcB by the correction coefficients αR, αG, and αB, and further multiplies them by the coefficient β, as in the following equations (18). The light source controller 130 stores the resultant values in the output coefficient memory 133a as the output coefficients KR, KG, and KB. That is, the output coefficients K are represented by products of the reference output coefficients Kc, correction coefficients α, and coefficient β.

$$KR=\beta \cdot \alpha R \cdot KcR$$

$$KG=\beta \cdot \alpha G \cdot KcG$$

$$KB=\beta \cdot \alpha B \cdot KcB \quad (18)$$

The above process is performed by, for example, the laser drive circuit 133. However, the calculation of the coefficient β may be performed by the color corrector 135 (e.g., the correction value determiner 135c).

According to the third modification, it is possible to control the output powers P of the lasers 111 so that the output powers P of the lasers 111 do not exceed the limit output powers Pu, while maintaining the advantages of the color correction in response to variations in the wavelengths λa.

The limit output powers PuR, PuG, and PuB are not limited to fixed values, and may be variable values. For example, from a viewpoint of maintaining the lifetimes of the lasers 111, the light source controller 130 may determine the limit output powers PuR, PuG, and PuB depending on the temperatures T of the respective lasers 111.

For example, the light source controller 130 detects, for each of the lasers 111, the temperature T of the laser 111 by a temperature measurement element, such as a thermistor. The light source controller 130 may determine the limit output powers Pu of the respective lasers 111, from the detected temperatures T, based on information indicating a predetermined relationship between the temperature and the limit output power Pu.

Such a configuration makes it possible to limit the output powers P of the lasers 111 while maintaining a state in which the displayed color is corrected. Thus, it is possible to display an image even a temperature range in which the temperature affects the lifetimes of the lasers 111. It is possible to prevent the lasers 111 from being used in such a manner that the lifetime of the image display apparatus 100 is reduced.

The above configuration of the third modification may be applied to the image display apparatus 100 of the first or second modification. That is, the image display apparatus 100 of the first or second modification may determine the coefficient β and adjust the magnitudes of the output coefficients KR, KG, and KB using the determined coefficient β.

In the above first embodiment and first to third modifications, the functions of the light source controller 130 may be implemented purely by hardware resources, such as electronic circuits. The functions of the light source controller 130 may also be implemented by cooperation between hardware resources and software resources. "Cooperation" indicates that different subjects share a goal and work together. Here, it indicates that hardware and software jointly perform processing.

Figure 14:
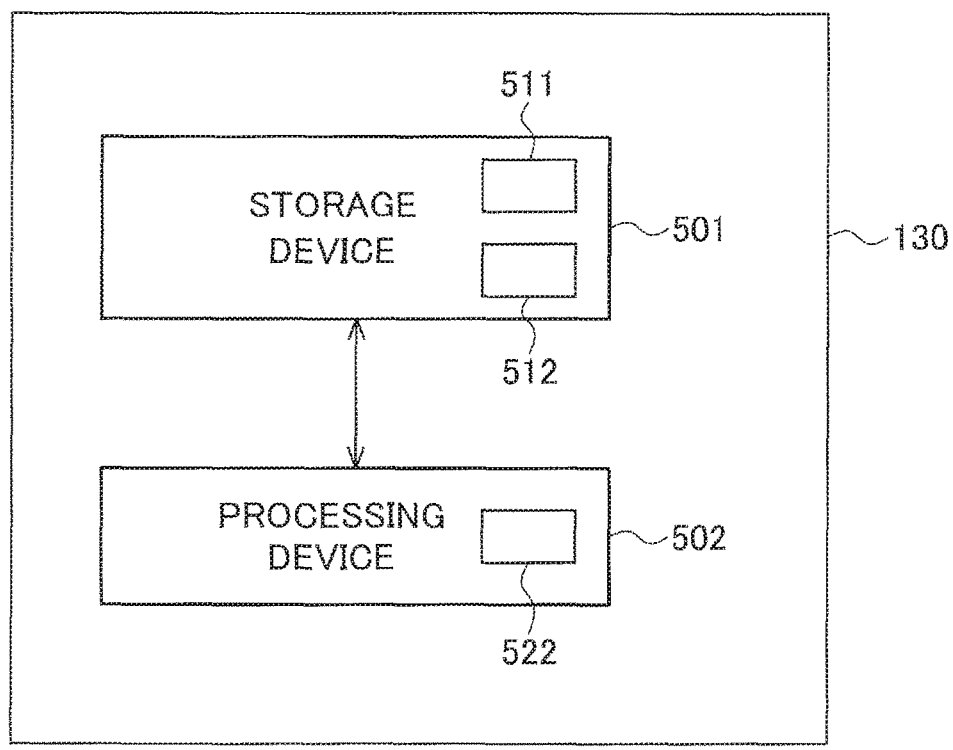
FIG. 14 is a schematic diagram illustrating an example of a configuration of the light source controller in the first embodiment.

FIG. 14 is a schematic diagram illustrating an example of a configuration of the light source controller 130.

In one example, as illustrated in FIG. 14, the light source controller 130 includes a storage device 501 and a processing device 502.

The storage device 501 includes, for example, one or more memories, such as a read only memory (ROM) 511 and a random access memory (RAM) 512, and stores a control program.

The processing device 502 includes, for example, a microprocessor 522 or the like, and executes the control program stored in the storage device 501. Thereby, the processing device 502 implements part or all of the functions of the light source controller 130.

In one example, in the light source controller 130, the image data converter 131, wavelength detector 134, and color corrector 135 are implemented by the processing device 502. The memory 136 is implemented by the storage device 501.

The scanner drive circuit 132 and laser drive circuit 133 are implemented by, for example, dedicated hardware circuits.

The control program may be recorded on a computer-readable recording medium, such as an optical disc. The control program may also be provided through a communication network, such as the Internet.

The present invention is not limited to the above embodiments (including the modifications); it can be practiced in various aspects without departing from the invention scope.

For example, the above embodiments (including the modifications) describe an example in which single-mode lasers having narrow wavelength spectral widths are used as the lasers 111. However, multimode lasers having wide wavelength spectral widths may be used.

When multimode lasers are used, the wavelength detector 134 detects spectra (or spectral distributions) of the laser lights as the information indicating the wavelengths λa, for example. Then, the color value determiner 135b determines the color values Ca from the spectra of the laser lights and color matching functions.

Specifically, the color values Ca are determined by integrating, with respect to the wavelength λa, products of the spectra and the color matching functions. The wavelength detector 134 previously stores information indicating correspondence relationships between peak wavelengths or center wavelengths and spectra of the laser lights. The wavelength detector 134 detects peak wavelengths or center wavelengths of the laser lights. The wavelength detector 134 may determine the spectra, from the above information indicating the correspondence relationships, based on the detected peak wavelengths or center wavelengths.

Further, in the above embodiments (including the modifications), the wavelength λa of each of the lasers 111 is detected. However, the light source controller 130 may be configured as follows.

The wavelength detector 134 detects information indicating the wavelength λa of each of a subset of the three lasers 111R, 111G, and 111B. Then, the color value determiner 135h determines the color value Ca of light from each of the subset of the lasers 111, for which the information indicating the wavelength λa has been detected.

For each of the subset of the lasers 111, for which the information indicating the wavelength λa has been detected, the correction value determiner 135c uses the color value Ca determined by the color value determiner 135b. For each of the three lasers 111R, 111G, and 111B other than the subset of the lasers 111, for each of which the information indicating the wavelength λa has been detected, the correction value determiner 135c uses a predetermined color value (the color value Cr corresponding to the reference wavelength λr).

For example, the light source controller 130 detects only the wavelength λaR of the red laser 111R, whose wavelength λa greatly varies with the temperature T. The light source controller 130 may calculate the correction value $D_8$ on the assumption that the wavelengths λaG and λaB of the green and blue lasers 111G and 111B do not vary. Specifically, the light source controller 130 determines the correction value $D_8$ on the assumption that the wavelengths λaG and λaB are always the reference wavelengths λrG and λrB.

Further, in the above embodiments (including the modifications), the wavelength detector 134 determines the wavelengths λa as the information indicating the wavelengths. However, the wavelength detector 134 may obtain, for example, the incident positions of the laser lights on the detector 115C in FIG. 3, as the information indicating the wavelengths.

In this case, the color value determiner 135b determines the color values Ca from the incident positions based on, for example, previously stored information indicating a correspondence relationship between the incident position and the color value Ca.

Likewise, the wavelength detector 134 may obtain information indicating the amounts of the laser lights incident on the detector 115E in FIG. 4, as the information indicating the wavelengths. The wavelength detector 134 may also obtain information indicating the temperatures TR, TG, and TB detected by the temperature measurement elements 115FR, 115FG, and 115FB in FIG. 7, as the information indicating the wavelengths.

Further, in the above embodiments (including the modifications), the output coefficients KR, KG, and KB are stored in the output coefficient memory 133a in the laser drive circuit 133. However, the laser drive circuit 133 may obtain the output coefficients KR, KG, and KB from the outside.

For example, the output coefficients KR, KG, and KB may be determined outside the laser drive circuit 133 (e.g., by the color corrector 135), and externally supplied to the laser drive circuit 133. In this case, the output coefficient memory 133a in the laser drive circuit 133 may be omitted.

Further, in the above embodiments (including the modifications), a scan display apparatus using the lasers 111 and HEMS mirror is described as the image display apparatus 100. However, the image display apparatus 100 is not limited to this.

For example, the image display apparatus 100 may be a digital light processing (DLP) (registered trademark) display apparatus that uses a digital micromirror device (DMD) (registered trademark) and lasers as light sources. The image display apparatus 100 may be a liquid crystal display apparatus that uses lasers as a backlight.

Further, the light sources are not limited to laser light sources, and may be other types of light sources, such as light emitting diodes (LEDs).

For example, a red laser, a green LED, and a blue LED may be used as the light sources. In this case, although the wavelength of each of the light sources may be detected, only the wavelength of the red laser, whose wavelength greatly varies, may be detected. For the green and blue LEDs, predetermined wavelengths or color values may be used on the assumption that their wavelengths do not vary.

The image display apparatus 100 may include four or more light sources.

For example, the image display apparatus 100 may be modified as follows.

The light source unit 110 includes first, second, . . . , Nth (N is an integer of 3 or more) light sources.

The memory 136 stores the ratio Kc1:Kc2: . . . :KcN between the output powers P indicated by the drive signal $D_4$ supplied to the first, second, . . . , Nth light sources when the wavelengths λa of lights from the respective light sources are reference wavelengths λr and the color of light emitted from the light source unit 110 is a reference white.

That is, the memory 136 stores the ratio Kc1:Kc2: . . . :KcN between the output powers P. The ratio Kc1:Kc2: . . . :KcN is the ratio between the output powers P when the wavelengths λa of lights from the respective light sources are reference wavelengths λr and the color of light emitted from the light source unit 110 is a reference white. The output powers P are indicated by the drive signal $D_4$ supplied to the light sources.

The correction value determiner 135c determines, as a correction value $D_8$, correction coefficients α1, α2, . . . , αN for correcting the ratio Kc1:Kc2: . . . :KcN based on the color values Ca of lights from the respective light sources determined by the color value determiner 135b.

That is, the correction value determiner 135c determines correction coefficients α1, α2, . . . , αN based on the color values Ca. The correction coefficients α1, α2, . . . , αN are the correction value $D_8$ for correcting the ratio Kc1:Kc2: . . . :KcN.

The laser drive circuit 133 corrects, based on the correction coefficients α1, α2, αN determined by the correction value determiner 135c, the ratio Kc1:Kc2: . . . :KcN stored in the memory 136 to a ratio α1·Kc1:α2·Kc2: . . . :αN·KcN. Then, the laser drive circuit 133 uses the corrected ratio α1·Kc1:α2·Kc2: . . . :αN·KcN to determine the ratio between the output powers P of the respective light sources. The laser drive circuit 133 supplies the light sources with a drive signal $D_4$ based on the determined ratio between the output powers P.

In this case, the correction value determiner 135c calculates the ratio Ka1:Ka2: . . . :KaN between the powers of lights from the first, second, . . . , Nth light sources when the color values C of lights from the respective light sources are the color values Ca determined by the color value determiner 135b and the color value Ci of the combined light is the color value CW of the reference white. That the correction value determiner 135c determines the ratio Ka1:Ka2: . . . :KaN between the powers P when the color values are the color values Ca and the color value Ci is the color value CW.

It calculates the ratio Kr1:Kr2: . . . :KrN between the powers P of light from the first, second, . . . , Nth light sources when the color values C of lights from the respective light sources are the color values Cr corresponding to the reference wavelengths λr and the color value Ci of the combined light is the color value CW of the reference white. That is, it determines the ratio Kr1:Kr2: . . . :KrN between the powers P when the color values C are the color values Cr and the color value Ci is the color value CW.

It may determine Ka1/Kr1, Ka2/Kr2, . . . , KaN/KrN as the correction coefficients α1, α2, . . . , αN from the ratio Ka1:Ka2: . . . :KaN and the ratio Kr1:Kr2: . . . :KrN.

The laser drive circuit 133 receives, for each of pixels constituting an image to be displayed, grayscale values I1, I2, . . . , IN respectively corresponding to the first, second, . . . , Nth might sources from the image data converter 131, for example. The laser drive circuit 133 determines $\alpha 1 \cdot Kc1 \cdot I1 : \alpha 2 \cdot Kc2 \cdot I2 : \ldots : \alpha N \cdot KcN \cdot IN$ as the ratio between the output powers P of the first, second, ..., Nth light sources.

In this case, the laser drive circuit 133 determines, based on a maximum value Imax of the grayscale values I1, I2, ..., IN, and predetermined upper limits Pu1, Pu2, ..., PuN of the output powers P of the first, second, ..., Nth light sources, a coefficient β that satisfies all of the N conditions expressed by the following equations (19). That is, the laser drive circuit 133 determines, based on a maximum value Imax of the grayscale values I and limit output powers Pu, a coefficient β that satisfies all of the N conditions expressed by the following equations (19).

$$\beta \cdot \alpha 1 \cdot Kc1 \cdot I\max \leq Pu1,$$

$$\beta \cdot \alpha 2 \cdot Kc2 \cdot I\max \leq Pu2,$$

$$\ldots,$$

$$\beta \cdot \alpha N \cdot KcN \cdot I\max \leq PuN \quad (19)$$

The laser drive circuit 133 may determine, for each pixel, $\beta \cdot \alpha 1 \cdot Kc1 \cdot I1$, $\beta \cdot \alpha 2 \cdot Kc2 \cdot I2$, ..., $\beta \cdot \alpha N \cdot KcN \cdot IN$ as the output powers P of the first, second, ..., Nth light sources. For example, it may determine $\beta \cdot \alpha 1 \cdot Kc1 \cdot I1$ as the output power P1 of the first light source. It may also determine $\beta \cdot \alpha N \cdot KcN \cdot IN$ as the output power PN of the Nth light source.

Further, in the above embodiments (including the modifications), an XYZ color system is used as the color space, but other types of color spaces may be used.

Further, in the above embodiments (including the modifications), as the image display apparatus 100, a head-up display for displaying a virtual image is described as an example. However, the image display apparatus 100 may be, for example, other types of display apparatuses, such as liquid crystal monitors, projection televisions, or projectors, that display real images.

Further, the present invention is preferably applied to image display apparatuses, such as in-vehicle image display apparatuses, that are used over a wide range of temperature. However, it may be applied to image display apparatuses for other purposes.

APPENDIXES

Appendix 1

An image display apparatus comprising:
a light source unit including three or more light sources that emit lights of different wavelengths, the light source unit combining the lights emitted from the three or more light sources and emitting the combined light;
a wavelength detector that detects, for each of the light sources, wavelength information indicating the wavelength of the light emitted from the light source;
a color value determiner that determines, for each of the light sources, from the wavelength information of the light source detected by the wavelength detector, a color value indicating a color of the light from the light source in a predetermined color space;
a correction value determiner that determines, based on the color values of the lights from the respective light sources determined by the color value determiner, a correction value for correcting a ratio between intensities of the lights from the respective light sources so that a color of the light obtained by combining the lights from the respective light sources is a color to be displayed; and
a driver that drives the light sources so that the ratio between the intensities of the lights from the respective light sources is a ratio corrected based on the correction value determined by the correction value determiner.

Appendix 2

The image display apparatus of Appendix 1, further comprising a correction necessity determiner that determines whether the correction is required,
wherein when the correction necessity determiner determines that the correction is required, the color value determiner determines the color values.

Appendix 3

The image display apparatus of Appendix 2, wherein the correction necessity determiner determines whether the correction is required, based on the wavelength information detected by the wavelength detector.

Appendix 4

The image display apparatus of any one of Appendixes 1 to 3, wherein each of the light sources is a laser light source.

Appendix 5

The image display apparatus of any one of Appendixes 1 to 4, wherein the color value determiner determines tristimulus values in an XYZ color system as the color values.

Appendix 6

The image display apparatus of any one of Appendixes 1 to 5, wherein:
the driver supplies each of the light sources with a drive signal indicating an output intensity that is an intensity of light to be emitted by the light source;
each of the light sources emits light having an intensity corresponding to the drive signal supplied from the driver;
the three or more light sources are first, second, ..., Nth (N is an integer of 3 or more) light sources;
the image display apparatus further comprises a memory that stores a ratio $Kc1:Kc2: \ldots :KcN$ between the output intensities indicated by the drive signals supplied to the first, second, ..., Nth light sources when the wavelengths of the lights from the respective light sources are reference wavelengths and the color of the light emitted from the light source unit is a reference white;
the correction value determiner determines, based on the color values of the lights from the respective light sources determined by the color value determiner, as the correction value, correction coefficients $\alpha 1, \alpha 2, \ldots, \alpha N$ for correcting the ratio $Kc1:Kc2: \ldots :KcN$; and
the driver corrects, based on the correction coefficients $\alpha 1, \alpha 2, \ldots, \alpha N$ determined by the correction value determiner, the ratio $Kc1:Kc2: \ldots :KcN$ stored in the memory to a ratio $\alpha 1 \cdot Kc1 : \alpha 2 \cdot Kc2 : \ldots : \alpha N \cdot KcN$, determines a ratio between the output intensities of the respective light sources using the corrected ratio, and supplies the light sources with the drive signals according to the ratio between the output intensities.

Appendix 7

The image display apparatus of Appendix 6, wherein the correction value determiner:

calculates a ratio Ka1:Ka2: ... :KaN between the intensities of the lights from the first, second, ..., Nth light sources when the color values of the lights from the respective light sources are the color values determined by the color value determiner and the color value of the light obtained by combining the lights from the respective light sources is a color value or a reference white in the color space;

calculates a ratio Kr1:Kr2: ... :KrN between the intensities of the lights from the first, second, ..., Nth light sources when the color values of the lights from the respective light sources are color values corresponding to the reference wavelengths in the color space and the color value of the light obtained by combining the lights from the respective light sources is the color value of the reference white in the color space; and determines, from the ratio Ka1:Ka2: ... :KaN and the ratio Kr1:Kr2: ... :KrN, Ka1/Kr1, Ka2/Kr2, ..., KaN/KrN as the correction coefficients $\alpha 1, \alpha 2, \ldots, \alpha N$.

Appendix 8

The image display apparatus of Appendix 6 or 7, wherein for each of pixels constituting an image to be displayed, the driver receives grayscale values I1, I2, ..., IN respectively corresponding to the first, second, ..., Nth light sources, and determines $\alpha 1 \cdot Kc1 \cdot I1 : \alpha 2 \cdot Kc2 \cdot I2 : \ldots : \alpha N \cdot KcN \cdot IN$ as the ratio between the output intensities of the first, second, ..., Nth light sources.

Appendix 9

The image display apparatus of Appendix 8, wherein the driver:

determines, based on a maximum value Imax of the grayscale values I1, I2, ..., IN, and predetermined upper limits Pu1, Pu2, ..., PuN of the output intensities of the first, second, ..., Nth light sources, a coefficient $\beta$ that satisfies $\beta \cdot \alpha 1 \cdot Kc1 \cdot Imax \leq Pu1$, $\beta \cdot \alpha 2 \cdot Kc2 \cdot Imax \leq Pu2$, ..., $\beta \cdot \alpha N \cdot KcN \cdot Imax \leq PuN$; and determines, for each of the pixels, $\beta \cdot \alpha 1 \cdot Kc1 \cdot I1$, $\beta \cdot \alpha 2 \cdot Kc2 \cdot I2, \ldots, \beta \cdot \alpha N \cdot KcN \cdot IN$ as the output intensities of the first, second, ..., Nth light sources.

Appendix 10

The image display apparatus of any one of Appendixes 1 to 5, wherein the driver receives image data representing an image to be displayed, corrects a ratio between the intensities of the lights from the respective light sources indicated by the image data based on the correction value determined by the correction value determiner, and drives the light sources to emit light at the corrected ratio between the intensities.

Appendix 11

The image display apparatus of any one of Appendixes 1 to 10, wherein:

the wavelength detector detects wavelength information for a subset of the three or more light sources, instead of detecting the wavelength information for each of the light sources;

the color value determiner determines a color value of light from each of the subset of the light sources, instead of determining the color value of light from each of the light sources; and the correction value determiner uses, for each of the subset of the light sources, the color value determined by the color value determiner, and uses, for each of the three or more light sources other than the subset, a predetermined color value.

Appendix 12

A display correction method for an image display apparatus including a light source unit including three or more light sources that emit lights of different wavelengths, the light source unit combining the lights emitted from the three or more light sources and emitting the combined light, the display correction method comprising:

a wavelength detection step that detects, for each of the light sources, wavelength information indicating the wavelength of the light emitted from the light source;

a color value determination step that determines, for each of the light sources, from the wavelength information of the light source detected by the wavelength detection step, a color value indicating a color of the light from the light source in a predetermined color space;

a correction value determination step that determines, based on the color values of the lights from the respective light sources determined by the color value determination step, a correction value for correcting a ratio between intensities of the lights from the respective light sources so that a color of the light obtained by combining the lights from the respective light sources is a color to be displayed; and a driving step that drives the light sources so that the ratio between the intensities of the lights from the respective light sources is a ratio corrected based on the correction value determined by the correction value determination step.

Appendix 13

The display correction method of Appendix 12, further comprising a correction necessity determination step that determines whether the correction is required, wherein when the correction necessity determination step determines that the correction is required, the color value determination step determines the color values.

Appendix 14

The display correction method of Appendix 13, wherein the correction necessity determination step determines whether the correction is required, based on the wavelength information detected by the wavelength detection step.

Appendix 15

The display correction method of any one of Appendixes 12 to 14, wherein each of the light sources is a laser light source.

Appendix 16

The display correction method of any one or Appendixes 12 to 15, wherein the color value determination step determines tristimulus values in an XYZ color system as the color values.

Appendix 17

The display correction method of any one of Appendixes 12 to 16, wherein:

the driving step supplies each of the light sources with a drive signal indicating an output intensity that is an intensity of light to be emitted by the light source;

each of the light sources emits light having an intensity corresponding to the drive signal supplied from the driving step;

the three or more light sources are first, second, . . . , Nth (N is an integer of 3 or more) light sources;

the display correction method further comprises a storing step that stores a ratio Kc1:Kc2: . . . :KcN between the output intensities indicated by the drive signals supplied to the first, second, . . . , Nth light sources when the wavelengths of the lights from the respective light sources are reference wavelengths and the color of the light emitted from the light source unit is a reference white;

the correction value determination step determines, based on the color values of the lights from the respective light sources determined by the color value determination step, as the correction value, correction coefficients $\alpha 1, \alpha 2, \ldots, \alpha N$ for correcting the ratio Kc1:Kc2: . . . :KcN; and the driving step corrects, based on the correction coefficients $\alpha 1, \alpha 2, \ldots, \alpha N$ determined by the correction value determination step, the ratio Kc1:Kc2: . . . :KcN stored in the storing step to a ratio $\alpha 1 \cdot$Kc1:$\alpha 2 \cdot$Kc2: . . . :$\alpha N \cdot$KcN, determines a ratio between the output intensities of the respective light sources using the corrected ratio, and supplies the light sources with the drive signals according to the ratio between the output intensities.

Appendix 18

The display correction method of Appendix 17, wherein the correction value determination step:

calculates a ratio Ka1:Ka2: . . . :KaN between the intensities of the lights from the first, second, . . . , Nth light sources when the color values of the lights from the respective light sources are the color values determined by the color value determination step and the color value of the light obtained by combining the lights from the respective light sources is a color value of a reference white in the color space;

calculates a ratio Kr1:Kr2: . . . :KrN between the intensities of the lights from the first, second, . . . , light sources when the color values of the lights from the respective light sources are color values corresponding to the reference wavelengths in the color space and the color value of the light obtained by combining the lights from the respective light sources is the color value of the reference white in the color space; and determines, from the ratio Ka1:Ka2: . . . :KaN and the ratio Kr1:Kr2: . . . :KrN, Ka1/Kr1, Ka2/Kr2, . . . , KaN/KrN as the correction coefficients $\alpha 1, \alpha 2, \ldots, \alpha N$.

Appendix 19

The display correction method of Appendix 17 or 18, wherein for each of pixels constituting an image to be displayed, the driving step receives grayscale values I1, I2, . . . , IN respectively corresponding to the first, second, . . . , Nth light sources, and determines $\alpha 1 \cdot$Kc1$\cdot$I1: $\alpha 2 \cdot$Kc2$\cdot$I2: . . . :$\alpha N \cdot$KcN$\cdot$IN as the ratio between the output intensities of the first, second, . . . , Nth light sources.

Appendix 20

The display correction method of Appendix 19, wherein the driving step:

determines, based on a maximum value Imax of the grayscale values I1, I2, . . . , IN, and predetermined upper limits Pu1, Pu2, . . . , PuN of the output intensities of the first, second, . . . , Nth light sources, a coefficient $\beta$ that satisfies $\beta \cdot \alpha 1 \cdot$Kc1$\cdot$Imax$\leq$Pu1, $\beta \cdot \alpha 2 \cdot$Kc2$\cdot$Imax$\leq$Pu2, . . . , $\beta \cdot \alpha N \cdot$KcN$\cdot$Imax$\leq$PuN; and determines, for each of the pixels, $\beta \cdot \alpha 1 \cdot$Kc1$\cdot$I1, $\beta \cdot \alpha 2 \cdot$Kc2$\cdot$I2, . . . , $\beta \cdot \alpha N \cdot$KcN$\cdot$IN as the output intensities of the first, second, . . . , Nth light sources.

Appendix 21

The display correction method of any one of Appendixes 12 to 16, wherein the driving step receives image data representing an image to be displayed, corrects a ratio between the intensities of the lights from the respective light sources indicated by the image data based on the correction value determined by the correction value determination step, and drives the light sources to emit light at the corrected ratio between the intensities.

Appendix 22

The display correction method of any one of Appendixes 12 to 21, wherein:

the wavelength detection step detects wavelength information for a subset of the three or more light sources, instead of detecting the wavelength information for each of the light sources;

the color value determination step determines a color value of light from each of the subset of the light sources, instead of determining the color value of light from each of the light sources; and the correction value determination step uses, for each of the subset of the light sources, the color value determined by the color value determination step, and uses, for each of the three or more light sources other than the subset, a predetermined color value.

REFERENCE SIGNS LIST

100 image display apparatus, 110 light source unit, 111R, 111G, 111B semiconductor lasers, 130 light source controller, 133 laser drive circuit, 134 wavelength detector, 135 color corrector, 135*a* correction necessity determiner, 135*b* color value determiner, 135*c* correction value determiner, 136 memory.

The invention claimed is:

1. An image display apparatus comprising:
   a light source unit including three or more light sources that emit lights of different wavelengths, the light source unit combining the lights emitted from the three or more light sources and emitting the combined light;
   a wavelength detector that detects, for each of the light sources, wavelength information indicating the wavelength of the light emitted from the light source;
   a color value determiner that determines, for each of the light sources, from the wavelength information of the light source detected by the wavelength detector, a color value indicating a color of the light from the light source in a predetermined color space;
   a correction value determiner that determines, based on the color values of the lights from the respective light sources determined by the color value determiner, a correction value for correcting a ratio between the intensities of the lights from the respective light sources so that the color of the light obtained by combining the lights from the respective light sources is a color to be displayed; and a driver that drives the light sources so that the ratio between the intensities of the lights from the respective light sources is a ratio corrected based on the correction value determined by the correction value determiner, wherein the correction value determiner:

determines a ratio between the intensities of the lights from the respective light sources when the color values of the lights from the respective light sources are the color values determined by the color value determiner and the color of the light obtained by combining the lights from the respective light sources is a reference white; and determines the correction value from the determined ratio between the intensities of the lights and a ratio between the intensities of the lights from the respective light sources when the wavelengths of the lights from the respective light sources are reference wavelengths of the respective light sources and the color of the light obtained by combining the lights emitted from the respective light sources is the reference white.

2. The image display apparatus of claim 1, further comprising a correction necessity determiner that determines whether the correction is required, wherein when the correction necessity determiner determines that the correction is required, the color value determiner determines the color values.

3. The image display apparatus of claim 2, wherein the correction necessity determiner determines whether the correction is required, based on the wavelength information detected by the wavelength detector.

4. The image display apparatus of claim 1, wherein the color value determiner determines tristimulus values in an XYZ color system as the color values.

5. The image display apparatus of claim 1, wherein:

the driver supplies each of the light sources with a drive signal indicating an output intensity that is an intensity of light to be emitted by the light source;

each of the light sources emits light having an intensity corresponding to the drive signal supplied from the driver;

the three or more light sources are first, second, . . . , Nth (N is an integer of 3 or more) light sources;

the image display apparatus further comprises a memory that stores a ratio $Kc1:Kc2: \ldots :KcN$ between the output intensities indicated by the drive signals supplied to the first, second, . . . , Nth light sources when the wavelengths of the lights from the respective light sources are reference wavelengths and the color of the light emitted from the light source unit is a reference white;

the correction value determiner determines, based on the color values of the lights from the respective light sources determined by the color value determiner, as the correction value, correction coefficients $\alpha 1, \alpha 2, \ldots, \alpha N$ for correcting the ratio $Kc1:Kc2: \ldots :KcN$; and the driver corrects, based on the correction coefficients $\alpha 1, \alpha 2, \ldots, \alpha N$ determined by the correction value determiner, the ratio $Kc1:Kc2: \ldots :KcN$ stored in the memory to a ratio $\alpha 1 \cdot Kc1:\alpha 2 \cdot Kc2: \ldots :\alpha N \cdot KcN$, determines a ratio between the output intensities of the respective light sources using the corrected ratio, and supplies the light sources with the drive signals according to the ratio between the output intensities.

6. The image display apparatus of claim 5, wherein the correction value determiner:

calculates a ratio $Ka1:Ka2: \ldots :KaN$ between the intensities of the lights from the first, second, . . . , Nth light sources when the color values of the lights from the respective light sources are the color values determined by the color value determiner and the color value of the light obtained by combining the lights from the respective light sources is a color value of a reference white in the color space;

calculates a ratio $Kr1:Kr2: \ldots :KrN$ between the intensities of the lights from the first, second, . . . , Nth light sources when the color values of the lights from the respective light sources are color values corresponding to the reference wavelengths in the color space and the color value of the light obtained by combining the lights from the respective light sources is the color value of the reference white in the color space; and determines, from the ratio $Ka1:Ka2: \ldots :KaN$ and the ratio $Kr1:Kr2: \ldots :KrN$, $Ka1/Kr1, Ka2/Kr2, KaN/KrN$ as the correction coefficients $\alpha 1, \alpha 2, \ldots, \alpha N$.

7. The image display apparatus of claim 5, wherein for each of pixels constituting an image to be displayed, the driver receives grayscale values $I1, I2, \ldots, IN$ respectively corresponding to the first, second, . . . , Nth light sources, and determines $\alpha 1 \cdot Kc1 \cdot I1:\alpha 2 \cdot Kc2 \cdot I2: \ldots :\alpha N \cdot KcN \cdot IN$ as the ratio between the output intensities of the first, second, . . . , Nth light sources.

8. The image display apparatus of claim 7, wherein the driver:

determines, based on a maximum value Imax of the grayscale values $I1, I2, \ldots, IN$, and predetermined upper limits $Pu1, Pu2, \ldots, PuN$ of the output intensities of the first, second, . . . , Nth light sources, a coefficient $\beta$ that satisfies $\beta \cdot \alpha 1 \cdot Kc1 \cdot Imax \leq Pu1$, $\beta \cdot \alpha 2 \cdot Kc2 \cdot Imax \leq Pu2, \ldots, \beta \cdot \alpha N \cdot KcN \cdot Imax \leq PuN$; and determines, for each of the pixels, $\beta \cdot \alpha 1 \cdot Kc1 \cdot I1$, $\beta \cdot \alpha 2 \cdot Kc2 \cdot I2, \ldots, \beta \cdot \alpha N \cdot KcN \cdot IN$ as the output intensities of the first, second, . . . , Nth light sources.

9. The image display apparatus of claim 1, wherein the driver receives image data representing an image to be displayed, corrects a ratio between the intensities of the lights from the respective light sources indicated by the image data based on the correction value determined by the correction value determiner, and drives the light sources to emit light at the corrected ratio between the intensities.

10. The image display apparatus of claim 1, wherein:

the wavelength detector detects wavelength information for a subset of the three or more light sources, instead of detecting the wavelength information for each of the light sources;

the color value determiner determines a color value of light from each of the subset of the light sources, instead of determining the color value of light from each of the light sources; and the correction value determiner uses, for each of the subset of the light sources, the color value determined by the color value determiner, and uses, for each of the three or more light sources other than the subset, a predetermined color value.

11. The image display apparatus of claim 1, wherein each of the light sources is a laser light source.

12. A display correction method for an image display apparatus including a light source unit including three or more light sources that emit lights of different wavelengths, the light source unit combining the lights emitted from the three or more light sources and emitting the combined light, the display correction method comprising:

- a wavelength detection step that detects, for each of the light sources, wavelength information indicating the wavelength of the light emitted from the light source;
- a color value determination step that determines, for each of the light sources, from the wavelength information of the light source detected by the wavelength detection step, a color value indicating a color of the light from the light source in a predetermined color space;
- a correction value determination step that determines, based on the color values of the lights from the respective light sources determined by the color value determination step, a correction value for correcting a ratio between intensities of the lights from the respective light sources so that a color of the light obtained by combining the lights from the respective light sources is a color to be displayed; and
- a driving step that drives the light sources so that the ratio between the intensities of the lights from the respective light sources is a ratio corrected based on the correction value determined by the correction value determination step, wherein the correction valve determination step:
- determines a ratio between the intensities of the lights from the respective light sources when the color values of the lights from the respective light sources are the color values determined by the color value determination step and the color of the light obtained by combining the lights from the respective light sources is a reference white; and
- determines the correction value from the determined ratio between the intensities of the lights and a ratio between the intensities of the lights from the respective light sources when the wavelengths of the lights from the respective light sources are reference wavelengths of the respective light sources and the color of the light obtained by combining the lights emitted from the respective light sources is the reference white.

* * * * *